United States Patent
Wakao et al.

(10) Patent No.: US 7,416,572 B2
(45) Date of Patent: Aug. 26, 2008

(54) APPARATUS AND METHOD FOR DETERMINING REFORMING CATALYST DEGRADATION

(75) Inventors: Kazuhiro Wakao, Susono (JP); Kazuhiro Sakurai, Gotenba (JP); Takaaki Itou, Mishima (JP); Hiroki Ichinose, Fujinomiya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 392 days.

(21) Appl. No.: 10/816,857

(22) Filed: Apr. 5, 2004

(65) Prior Publication Data

US 2004/0205998 A1 Oct. 21, 2004

(30) Foreign Application Priority Data

Apr. 18, 2003 (JP) ............................. 2003-113537

(51) Int. Cl.
*C01B 3/32* (2006.01)
(52) U.S. Cl. ...................... 48/198.7; 48/127.9; 436/34; 436/37
(58) Field of Classification Search ................ 48/198.7, 48/127.9; 429/19–21, 24; 436/37, 34
See application file for complete search history.

(56) References Cited

U.S. PATENT DOCUMENTS

| 6,641,944 B2 * | 11/2003 | Kawasumi et al. ............. 429/19 |
| 2002/0187890 A1 * | 12/2002 | Naka et al. ..................... 502/38 |
| 2007/0028602 A1 * | 2/2007 | Dalla Betta et al. ........... 60/286 |

FOREIGN PATENT DOCUMENTS

| JP | 11-79702 | * | 3/1999 |
| JP | A-2000-53403 | | 2/2000 |
| JP | A-2000-63104 | | 2/2000 |
| JP | 2000-268840 | * | 9/2000 |
| JP | A-2001-226101 | | 8/2001 |
| JP | A 2002-54427 | | 2/2002 |
| JP | A-2002-124286 | | 4/2002 |
| WO | WO 01/00524 | * | 1/2001 |

* cited by examiner

*Primary Examiner*—N. Bhat
(74) *Attorney, Agent, or Firm*—Oliff & Berridge, PLC

(57) ABSTRACT

According to an apparatus and method for determining degradation of a reforming catalyst degradation which reforms a mixture of air and fuel, in a reformer that supplies a reformate gas to an engine of a vehicle, a temperature sensor detects a temperature of a reforming reaction portion in which is provided a reforming catalyst. An ECU then determines the extent of degradation of the reforming catalyst based on the temperature detected by the temperature sensor.

17 Claims, 17 Drawing Sheets

US 7,416,572 B2

APPARATUS AND METHOD FOR DETERMINING REFORMING CATALYST DEGRADATION

INCORPORATION BY REFERENCE

The disclosure of Japanese Patent Application No. 2003-11353 filed on Apr. 18, 2003, including the specification, drawings and abstract is incorporated herein by reference in its entirety.

BACKGROUND OF THE INVENTION

1. Field of the Invention

The invention relates to an apparatus and method for determining whether a reforming catalyst, which reforms a mixture of air and fuel, is degraded.

2. Description of the Related Art

As technology for improving fuel consumption in an engine for a vehicle, an apparatus is known which adds a reformate gas that includes CO and H2 both to fuel to be supplied to the combustion chamber of the engine, as well as to the exhaust gas discharged from the combustion chamber (e.g., JP(A) 2002-54427). This apparatus includes a CO shift catalyst that carries a noble metal on a carrier which has the ability to store oxygen. This CO shift catalyst produces a reformate gas that includes CO and H2 by reforming CO and H2O into H2 and CO2 through a water gas shift reaction.

The CO shift catalyst degrades over time, and as the CO shift catalyst degrades, the concentration ratio of CO to H2 (i.e., the CO/H2 concentration ratio) in the reformate gas produced by the CO shift catalyst changes. The related art therefore calculates the ability of the CO shift catalyst to store oxygen from the oxygen concentration at the fluid inlet and the fluid outlet of the CO shift catalyst. A numerical value indicative of this oxygen storage ability is then used to estimate the CO/H2 concentration ratio of the reformate gas. This CO/H2 concentration ratio of the reformate gas is related to the extent of degradation of the CO shift catalyst. The amount of reformate gas to be added to the fuel injected in the engine and to the exhaust gas discharged from the engine is then set based on this estimated CO/H2 concentration ratio.

In actuality, however, it is not easy to accurately calculate the oxygen storage ability of the catalyst. Moreover, in the example of the related art given above, it is necessary to use a plurality of expensive oxygen sensors in order to calculate the oxygen storage ability of the catalyst. Accordingly, with the related art, it is in effect difficult to easily and accurately determine degradation of the catalyst.

SUMMARY OF THE INVENTION

In view of the foregoing problems, this invention thus provides a reforming catalyst degradation determining apparatus able to both easily and accurately determine degradation of a reforming catalyst, a fuel reforming apparatus provided with the reforming catalyst degradation determining apparatus, and a reforming catalyst degradation determining method.

Accordingly, a first aspect of the invention relates to a reforming catalyst degradation determining apparatus includes a temperature sensor that detects a temperature of the reforming catalyst, and a determining portion that determines whether the reforming catalyst is degraded based on the temperature of the reforming catalyst detected by the temperature sensor.

A correlative relationship typically exists between the temperature of the reforming catalyst and the extent of degradation, such that, under identical operating conditions, the temperature (at a given location) of a degraded reforming catalyst during a reforming reaction is lower than the temperature (at the same location) of a reforming catalyst that is not degraded and is operating normally. Further, the temperature of the reforming catalyst can also be detected easily and accurately within various parameters relating to the reforming catalyst. Such a reforming catalyst degradation determining apparatus makes it possible to easily and accurately determine degradation of the reforming catalyst by determining the extent of degradation of the reforming catalyst based on the temperature of the reforming catalyst detected by the temperature sensor.

Accordingly, the determining portion may determine that the reforming catalyst is degraded if the temperature of the reforming catalyst detected by the temperature sensor is below a predetermined temperature. This predetermined temperature may be set according to an air-fuel ratio of an air-fuel mixture supplied to the reforming catalyst.

The temperature of the reforming catalyst typically rises when the air-fuel mixture supplied to the reforming catalyst is made lean (i.e., when the air-fuel ratio of the mixture is increased). When the reforming catalyst is degraded, however, the rate at which the temperature of the reforming catalyst rises after the change in the air-fuel ratio of the mixture is slower than it is when the reforming catalyst is operating normally (i.e., when it is not degraded). Moreover, when the air-fuel mixture supplied to the reforming catalyst is made rich (i.e., when the air-fuel ratio of the mixture is decreased), the temperature of the reforming catalyst typically decreases. When the reforming catalyst is degraded, however, the rate at which the temperature of the reforming catalyst falls after the change in the air-fuel ratio of the mixture is faster than it is when the reforming catalyst is operating normally (i.e., when it is not degraded).

Furthermore, if the air-fuel mixture supplied to the reforming catalyst is made lean (i.e., if the air-fuel ratio of the mixture is increased) when the upstream end portion of the reforming catalyst is degraded, the rate at which the temperature rises at the downstream end portion of the reforming catalyst after the change in the air-fuel ratio of the mixture is faster than it is when the reforming catalyst is operating normally (i.e., when it is not degraded). Moreover, if the air-fuel mixture supplied to the reforming catalyst is made rich (i.e., if the air-fuel ratio of the mixture is decreased) when the upstream end portion of the reforming catalyst is degraded, the rate at which the temperature falls at the downstream end portion of the reforming catalyst after the change in the air-fuel ratio of the mixture is slower than it is when the reforming catalyst is operating normally (i.e., when it is not degraded).

Therefore, considering the above tendencies, it is also possible to easily and accurately determine degradation of the reforming catalyst by determining the extent of degradation of the reforming catalyst based on the rate at which the temperature of the reforming catalyst rises or falls after the air-fuel ratio of the air-fuel mixture supplied to the reforming catalyst has been changed.

Accordingly, the determining portion of the reforming catalyst degradation determining apparatus according to this invention may determine whether the reforming catalyst is degraded based on the rate of change in the temperature of the reforming catalyst detected by the temperature sensor.

More specifically, the determining portion may determine that the reforming catalyst is degraded if the rate at which the temperature of the reforming catalyst detected by the temperature sensor rises has not reached a predetermined rate, after the temperature of the reforming catalyst starts to rise.

The determining portion may also determine that the rate at which the temperature of the reforming catalyst rises has not reached the predetermined rate if the temperature of the reforming catalyst has not reached a predetermined temperature within a predetermined time after the temperature of the reforming catalyst starts to rise.

Alternatively, the determining portion may determine that the rate at which the temperature of the reforming catalyst rises has not reached the predetermined rate based on the time it takes for the temperature of the reforming catalyst to rise to a predetermined temperature, after the temperature of the reforming catalyst starts to rise.

The determining portion may also determine that the reforming catalyst is degraded if the rate at which the temperature of the reforming catalyst falls is faster than a predetermined rate, after the temperature of the reforming catalyst starts to fall.

Typically, if the reforming catalyst is not degraded (i.e., if it is operating normally), the reforming reaction in the reforming catalyst mainly takes place at the end portion of the reforming catalyst that is on the upstream side with respect to the direction of flow of the air-fuel mixture (hereinafter, this end portion will simply be referred to as the "upstream end portion", and the opposite end portion of the reforming catalyst will simply be referred to as the "downstream end portion"). Therefore, during a reforming reaction, unless the reforming catalyst is degraded, the temperature of the downstream side end portion of the reforming catalyst is lower than the upstream side end portion of the reforming catalyst. As the reforming catalyst degrades, however, the reforming reaction in the reforming catalyst starts to take place at the downstream end portion of the reforming catalyst.

Therefore, as the reforming catalyst degrades, the temperature of the downstream side end portion of the reforming catalyst during a reforming reaction becomes higher than it does when the reforming catalyst is operating normally. Accordingly, it is possible to reliably detect degradation of the reforming catalyst by detecting the temperature of the downstream end portion of the reforming catalyst, and determining the extent of degradation of the reforming catalyst based on the detected temperature of the downstream end portion of the reforming catalyst.

Accordingly, the temperature sensor may be disposed on the downstream side of the reforming catalyst, and the determining portion may determine that the reforming catalyst is degraded if the temperature on the downstream side that was detected by the temperature sensor is higher than a predetermined temperature.

In the reforming catalyst degradation determining apparatus according to this invention, the determining portion may also determine that the reforming catalyst is degraded if, after observing that the temperature on the downstream side of the reforming catalyst detected by the temperature sensor is higher than a predetermined temperature, the temperature detected by the temperature sensor then falls below the predetermined temperature. If the reforming catalyst is degraded, such that the reforming reaction starts to take place at the downstream end portion of the reforming catalyst, the temperature of that end portion rises. However, because that downstream end portion of the reforming catalyst also degrades over time, the temperature of that end portion also decreases after first rising to a peak value. This structure therefore makes it possible to both easily and accurately determine degradation of the reforming catalyst.

The reforming catalyst degradation determining apparatus according to this invention may also be designed to detect the temperature on the upstream side of the reforming catalyst as well as the temperature on the downstream side of the catalyst.

As described above, when the reforming catalyst is degraded, the reforming reaction starts to take place at the downstream end portion of the reforming catalyst. Therefore, as the reforming catalyst degrades, the temperature difference between the upstream end portion of the reforming catalyst and the downstream end portion of the reforming catalyst becomes less and less, until finally the temperature of the downstream end portion of the reforming catalyst becomes higher than the temperature of the upstream end portion of the reforming catalyst. Accordingly, it is also possible to accurately determine degradation of the reforming catalyst by determining the extent of degradation of the reforming catalyst based on the difference between the temperature of the upstream end portion of the reforming catalyst and the temperature of the downstream end portion of the reforming catalyst. Furthermore in this case, it is also possible to easily execute a routine to determine degradation (hereinafter referred to as "degradation determining routine") because it is not necessary that the operating conditions of the reforming catalyst be the same each time the temperature is detected in order to make a determination as to whether the catalyst is degraded.

A second aspect of the invention relates to a reforming catalyst degradation determining method for determining degradation of a reforming catalyst that reforms a mixture of air and fuel. According to this method, a temperature of the reforming catalyst is detected and used to determine the extent of degradation of the reforming catalyst.

BRIEF DESCRIPTION OF THE DRAWINGS

The foregoing and further objects, features and advantages of the invention will become apparent from the following description of exemplary embodiments with reference to the accompanying drawings, wherein like numerals are used to represent like elements and wherein.

DETAILED DESCRIPTION OF THE EXEMPLARY EMBODIMENTS

A apparatus and method for determining degradation of a reforming catalyst according to the invention will be described in more detail in terms of exemplary embodiments with reference to the appended drawings.

First Exemplary Embodiment

Figure 1:
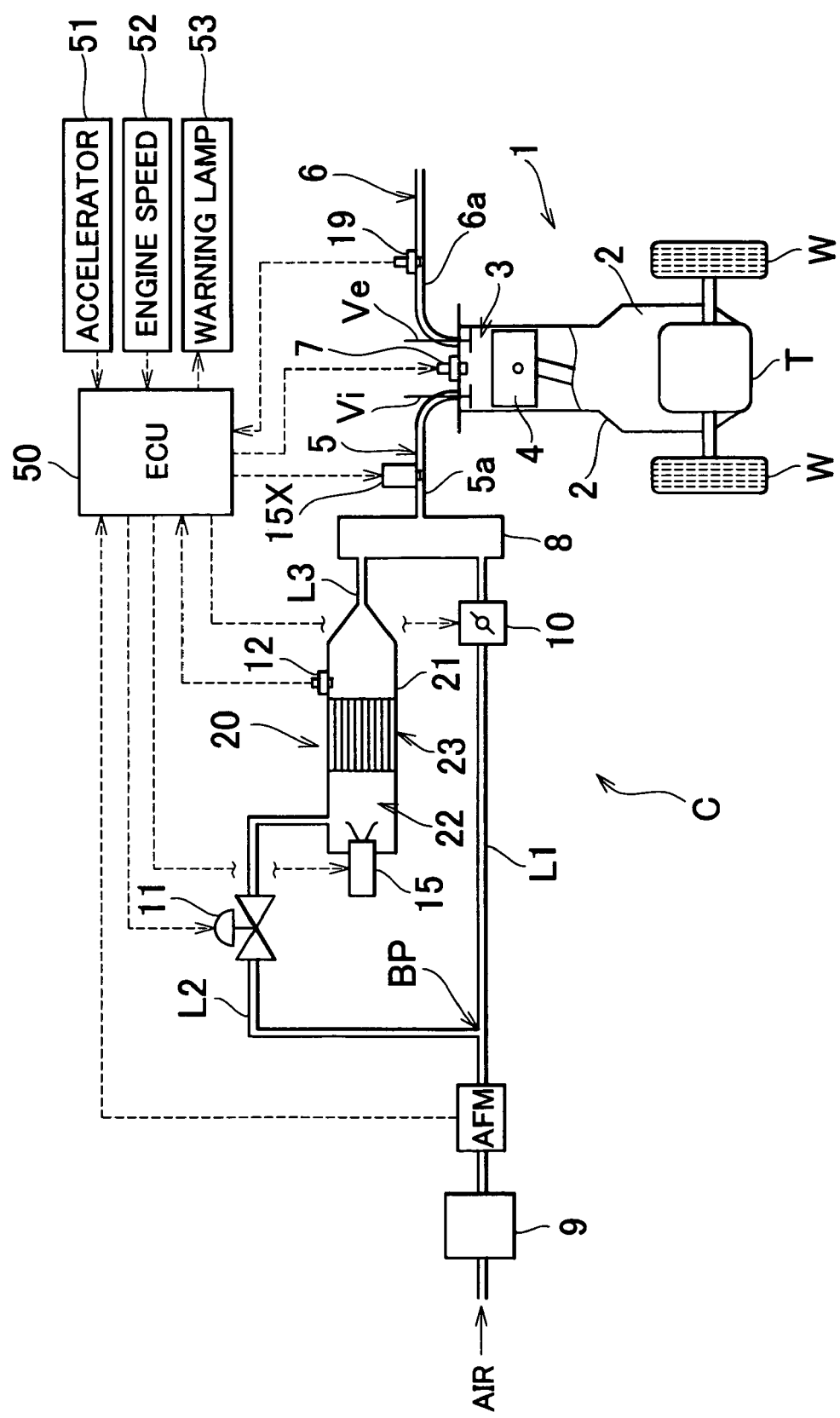
FIG. 1 is a block diagram schematically showing a vehicle provided with a fuel reforming apparatus that includes a reforming catalyst degradation determining apparatus according to a first exemplary embodiment of the invention.

FIG. 1 is a block diagram schematically showing a vehicle provided with a reformer (i.e., a fuel reforming apparatus) which includes a reforming catalyst degradation determining apparatus according to a first exemplary embodiment of the invention. A vehicle C shown in the drawing has an engine (i.e., internal combustion engine) 1 which serves as a prime mover for running. The engine 1 drives driven wheels W via a transaxle T. The engine 1 generates power by burning a mixture, which includes combustion components, in a combustion chamber 3 of a cylinder formed in an engine block 2 so as to drive a piston 4 back and forth in the cylinder. The engine 1 described in this exemplary embodiment is a multiple cylinder engine (such as a four cylinder engine), but for simplicity, only one of those cylinders is shown in FIG. 1. Subsequently, the following description will refer to the cylinders in the singular.

The intake port of the cylinder, which leads into the combustion chamber 3, is connected to an intake pipe 5a which forms an intake manifold 5. An exhaust port of the cylinder, which leads out of the combustion chamber 3, is connected to an exhaust pipe 6a which forms an exhaust manifold 6. An intake valve Vi and an exhaust valve Ve are provided for the combustion chamber 3 in a cylinder head of the engine. The intake valve Vi opens and closes the intake port and the exhaust valve Ve opens and closes the exhaust port. The intake valve Vi and exhaust valve Ve are opened and closed by a valve mechanism (not shown). This valve mechanism is a cam which has, for example, a variable valve timing function. Moreover, a spark plug 7 is provided in the cylinder head of the engine 1 in such a way that it is exposed in the combustion chamber 3. Also, an exhaust A/F sensor 19 is provided in the exhaust manifold 6. This exhaust A/F sensor 19 detects an air-fuel ratio of the exhaust gas discharged from the combustion chamber 3. The exhaust manifold 6 is connected to a catalyst apparatus (such as a three-way catalyst), not shown.

As shown in FIG. 1, the intake pipe 5a which forms the intake manifold 5 is connected to a surge tank 8. The intake manifold 5 (i.e., the intake pipe 5a) and the surge tank 8 make up the intake system of the engine 1. To this surge tank 8 is connected an intake pipe L1. This intake pipe L1 is in turn connected to an air inlet, not shown, via an air cleaner 9. A throttle (a throttle valve, in this exemplary embodiment) 10 is provided midway in the intake pipe L1 (between the surge tank 8 and the air cleaner 9).

An air flow meter AFM is also provided in the intake pipe L1. This air flow meter AFM is positioned between the air cleaner 9 and the throttle valve 10. A bypass pipe L2 bifurcates from the intake pipe L1 at a bifurcation portion (i.e., a bifurcation point) BP. This bifurcation point BP is located between the throttle valve 10 and the air flow meter AFM. The end of the bypass pipe L2 (i.e., the end of the bypass pipe L2 that is opposite the end at the bifurcation point BP) is connected to a reformer 20. A flowrate regulator valve 11 is provided between the bypass pipe L2 and the reformer 20.

The reformer 20 has a generally round main body 21, both ends of which are sealed. The inner portion of the main body 21 is divided into an air-fuel mixing portion 22 and a reforming reaction portion 23, which is adjacent to the air-fuel mixing portion 22. The bypass pipe L2 and a fuel injection valve 15 are connected to this air-fuel mixing portion 22. The fuel injection valve 15, which is able to inject a hydrocarbon fuel such as gasoline, is connected to a fuel tank via a fuel pump, not shown. A reforming catalyst, in which rhodium is carried on zirconia, is provided in the reforming reaction portion 23. An outlet end of the reformer 20 is connected to the surge tank 8 via a connecting pipe L3. Accordingly, the reformer 20 is arranged so as to bypass the intake pipe L1. Furthermore, a temperature sensor 12 is provided in the reformer 20. In this exemplary embodiment, the temperature sensor 12 is mounted to the main body 21 in a location downstream of the reforming reaction portion 23. The temperature sensor 12 detects the temperature of reformate gas discharged from the reforming reaction portion 23.

The spark plug (igniter) 7, valve mechanism (not shown), throttle valve 10, flowrate regulator valve 11, temperature sensor 12, exhaust A/F sensor 19, air flow meter AFM and the like are all connected to an electronic control unit (hereinafter referred to as "ECU") 50 which functions as a control portion of the engine 1. This ECU 50 includes a CPU, ROM, RAM, an input/output port, and a storage device in which is various information and maps and the like are stored. This ECU 50 receives a signal indicative of a depression amount of an accelerator pedal from an accelerator position sensor 51 and a signal indicative of the actual speed of the engine 1 from an engine speed sensor 52. The ECU 50 controls the opening amounts of the throttle valve 10 and the flowrate regulator valve 11, the fuel injection quantity injected from the fuel injection valve 15, and the ignition timing of the spark plug 7, based on detected values from the air flow meter AFM, the temperature sensor 12, the exhaust A/F sensor 19 and the like, as well as the signals from the accelerator position sensor 51 and the engine speed sensor 52 and the like.

When the vehicle C is operated, air is introduced into the air-fuel mixing portion 22 of the reformer 20 through the flowrate regulator valve 11, which is controlled by the ECU 50, in the bypass pipe L2. At the same time, fuel such as gasoline is injected from the fuel injection valve 15 which is also controlled by the ECU 50. The fuel is vaporized and mixed with the air from the bypass pipe L2 in the air-fuel mixing portion 22. The air-fuel mixture then flows into the reforming reaction portion 23, where the reforming catalyst promotes a reaction between the hydrocarbon fuel and the air. A partial oxidizing reaction, shown by Expression 1 below, is promoted in this reforming reaction portion.

$$CmHn+(m/2)O2 \rightarrow mCO+(n/2)H2 \quad (1)$$

The promotion of the reaction in Expression 1 produces a reformate gas which includes CO and H2, both of which are combustion components. The obtained reformate gas is then introduced from the reformer 20 into the surge tank 8 through the connecting pipe L3.

In addition, air is introduced into the surge tank 8 through the throttle valve 10, which is controlled by the ECU 50, in the intake pipe. Accordingly, the reformate gas is drawn into the combustion chamber 3 after further mixing with the air in the surge tank 8. Then when the spark plug 7 fires at a predetermined timing, the CO and H2, which are combustion components, burn in the combustion chamber 3, thus providing the force needed to drive the piston 4 back and forth. The piston 4 in turn drives the driven wheels W via the transaxle T. In the engine 1, it is also possible to stop supply of the air and fuel to the reformer 20, and obtain power by injecting fuel from a fuel injection valve 15x provided in the intake pipe 5a.

Figure 2:
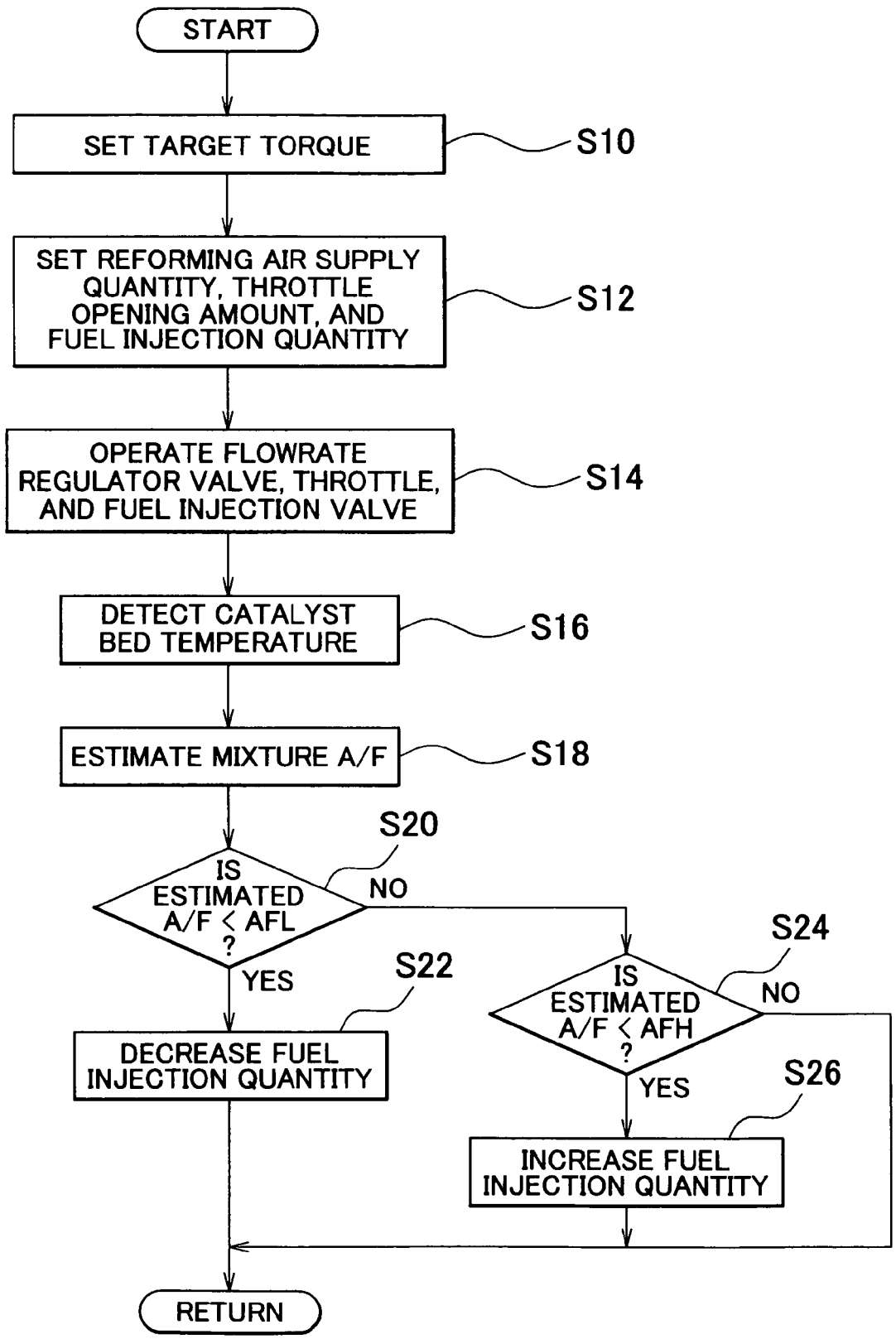
FIG. 2 is a flowchart of an operation executed in the vehicle shown in FIG. 1.

Next, operation during idle-off of the engine 1 in the vehicle C will be described in detail with reference to FIG. 2. As shown in the drawing, the accelerator position sensor 51 outputs a signal indicative of the accelerator pedal depression amount to the ECU 50. When the operating state of the engine 1 changes from an idling state to a non-idling state, the ECU 50 determines a target torque for the engine 1 (step S10). This target torque corresponds to the signal from the accelerator position sensor 51. After determining the target torque, the ECU 50 simultaneously sets the air quantity to be supplied to the reformer 20 (i.e., the reforming air supply quantity), the fuel injection quantity injected from the fuel injection valve 15, and the opening amount of the throttle valve 10.

That is, in step S12 the ECU 50 obtains the reforming air supply quantity corresponding to the target torque determined in step S10 from a map prepared in advance. This map defines the relationship between the target torque and the quantity of air to be provided to the reformer 20 (i.e., the reforming air supply quantity). In step S12, the ECU 50 calculates the fuel injection quantity to be injected by the fuel injection valve 15 with the relationship with the obtained reforming air supply quantity so that the air-fuel ratio of the mixture in the reformer 20 becomes, for example, 5.0.

At the same time in step S12, the ECU 50 uses the map that was prepared in advance to obtain the opening amount of the throttle valve 10 that corresponds to the target torque determined in step S10. The map for setting the throttle opening amount is prepared so that the opening amount of the throttle valve to make the air-fuel ratio of the mixture introduced into the combustion chamber 3 a desired value is determined according to the target torque. The map for setting the opening amount of the throttle is prepared based on a reforming air supply quantity and a fuel injection quantity calculated so that the air-fuel ratio of the mixture in the reformer 20 becomes, for example, 5.0.

Accordingly, both the quantity of the mixture supplied to the reformer 20 (i.e., the reforming air supply quantity plus the fuel injection quantity) and the quantity of the mixture introduced into the combustion chamber 3 (i.e., the reformate gas plus the air from the throttle valve 10) are set simultaneously according to the target torque. Further, the air-fuel ratio of the mixture in the reformer 20 is set to be substantially constant (e.g., A/F=5.0). The air-fuel ratio of the mixture in the combustion chamber 3 is set to a desired value such as the stoichiometric air-fuel ratio.

In step S14, the ECU 50 sets the opening amount of the throttle valve 10 to the opening amount obtained in step S12. The ECU 50 also controls the flowrate regulator valve 11 so that the indication value of the air flow meter AFM of the intake pipe L1 becomes the sum of the reforming air supply quantity obtained in step S12 and the flowrate that corresponds to the opening amount of the throttle valve 10 obtained in step S12. Further, fuel of a quantity obtained in step S12 is injected from the fuel injection valve 15. At this time, fuel is preferably injected from the fuel injection valve 15 when the air supplied from the flowrate regulator valve 11 has stabilized. Accordingly, the air-fuel ratio of the mixture in the reformer 20 is able to be accurately set.

Figure 3:
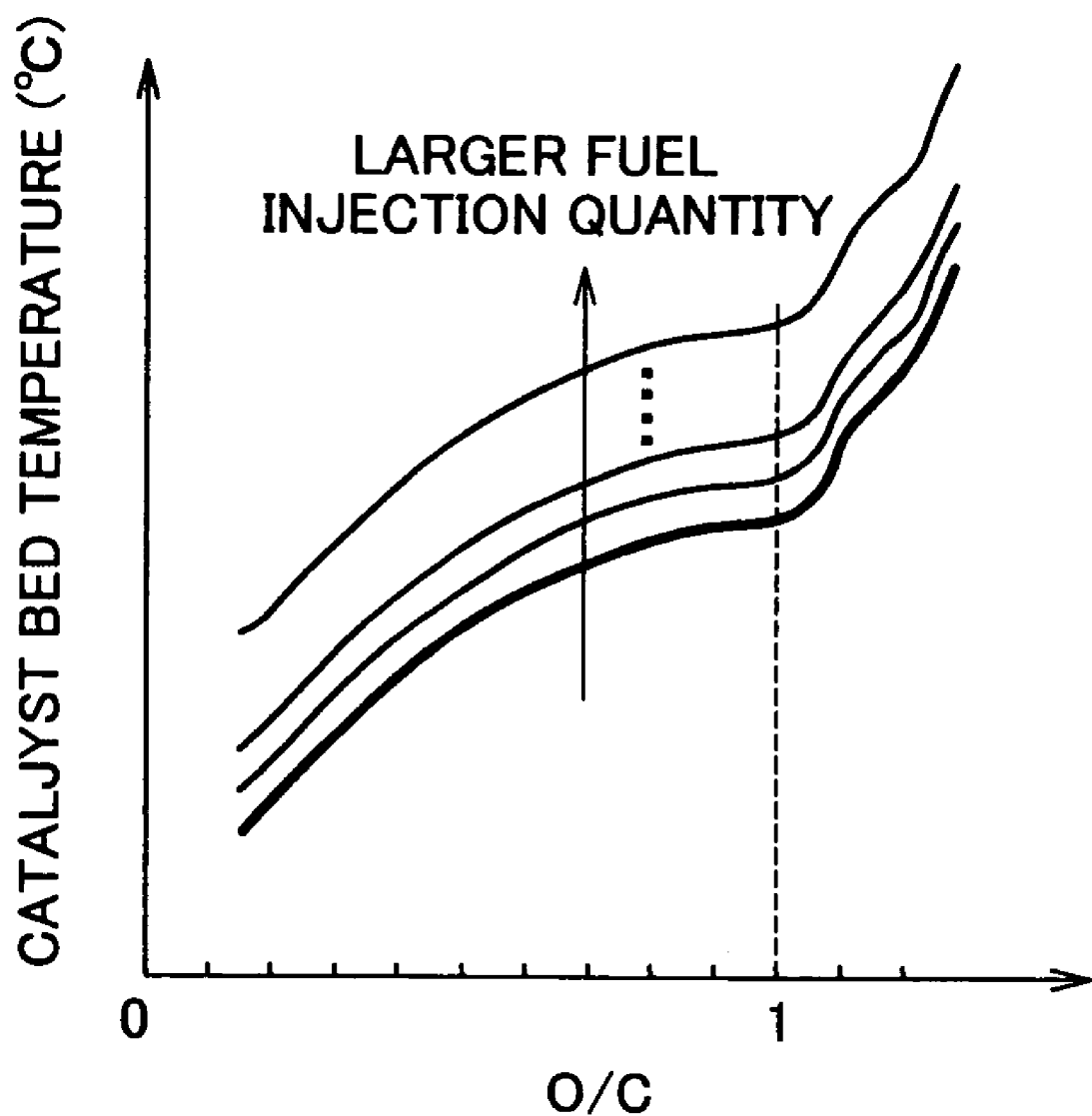
FIG. 3 is a representative view of one example of a map used to estimate the air-fuel ratio of the mixture in a reformer provided in the vehicle.

After performing the operations in step S14, the ECU 50 estimates the catalyst bed temperature (e.g., the average temperature of the reforming reaction portion 23) at the reforming reaction portion 23 of the reformer 20 based on a signal received from the temperature sensor 12 (step S16). The temperature sensor 12 is mounted in the main body 21 in a location downstream of the reforming reaction portion 23. After estimating the catalyst bed temperature at the reforming reaction portion 23, the ECU 50 estimates the air-fuel ratio of the mixture in the reformer 20 using the detected catalyst bed temperature, the fuel injection quantity obtained in step S12, and a map such as that shown in FIG. 3 (step S18).

That is, there is a correlative relationship between the catalyst bed temperature and the air-fuel ratio of the mixture in the reformer 20. Accordingly, the catalyst bed temperature at the reforming reaction portion 23 changes depending on the air-fuel ratio of the mixture in the reformer 20. The catalyst bed temperature also changes depending on the quantity of fuel supplied to the reformer 20. That is, an increase in the quantity of fuel supplied to the reformer 20 results in an increase in the catalyst bed temperature. Based on this tendency, a map (FIG. 3) is created in advance, which defines (i.e., corrects) the correlative relationship between the catalyst bed temperature and the air-fuel ratio of the mixture in the reformer 20 according to the fuel injection amount for the reformer 20 in the engine 1. The map that defines this correlative relationship is stored in the storage device of the ECU 50. Using this kind of map makes it possible to then accurately estimate the air-fuel ratio of the mixture in the reformer 20. In this way, the air-fuel ratio of the mixture in the reformer 20 is estimated from the catalyst bed temperature at the reforming reaction portion 23 and the quantity of fuel supplied to the reformer 20.

After estimating the air-fuel ratio of the mixture at the reformer 20, the ECU 50 then determines whether an the estimated value of the air-fuel ratio is less than a predetermined first threshold valve AFL (step S20). This first threshold value AFL is set, for example, to a value that is less than the target value for the air-fuel ratio determined in step S12 by a predetermined amount (i.e., a predetermined percentage). If the ECU 50 determines in step S20 that the estimated value of the air-fuel ratio is less than the threshold value AFL, then the ECU 50 (slightly) reduces the fuel injection quantity injected from the fuel injection valve 15 by either an amount corresponding to the difference between the estimated value of the air-fuel ratio and the threshold value AFL or by a predetermined amount (step S22). As a result, it is possible to make the air-fuel ratio in the reformer 20 greater than the threshold value AFL, and bring it close to the target value (roughly 5.0 in this exemplary embodiment).

On the other hand, if the ECU 50 determines in step S20 that the estimated value of the air-fuel ratio is not less than the first threshold value AFL, the ECU 50 then determines whether the estimated value of the air-fuel ratio is greater than a predetermined second threshold value AFH (step S24). The second threshold value AFH is set, for example, to a value that is greater than the target value for the air-fuel ratio determined in step S12 by a predetermined amount (i.e., a predetermined percentage). If the ECU 50 determines in step S24 that the estimated value of the air-fuel ratio is greater than the threshold value AFH, then the ECU 50 (slightly) increases the fuel injection quantity injected from the fuel injection valve 15 by either an amount corresponding to the difference between the estimated value of the air-fuel ratio and the threshold value AFH or by a predetermined amount (step S26). As a result, it is possible to make the air-fuel ratio in the reformer 20 less than the threshold value AFH, and bring it close to the target value (1 in this exemplary embodiment).

Accordingly, the air-fuel ratio of the mixture supplied to the reforming reaction portion 23 of the reformer 20 in the engine 1 is set to be substantially constant based on the catalyst bed temperature of the reformer 20 detected by the temperature sensor 12. Therefore, the reforming efficiency of the reformer 20 is able to be well maintained within a desired range. The air-fuel ratio of the mixture in the combustion chamber 3 in the engine 1 is also able to be set to a desired value. Therefore, it is possible to make the actual output torque accurately match the target torque. If in step S24 it is determined that the estimated value of the air-fuel ratio is not greater than the second threshold value AFH, i.e., if AFL$\leq$A/F$\leq$AFH, then the fuel injection quantity is not corrected and the ECU 50 repeats the operations in steps S10 to S26 for the duration of time that the engine 1 is in the idle-off state.

As described above, the engine 1 of the vehicle C is driven using reformate gas produced by the reformer 20. However, the reforming catalyst in the reforming reaction portion 23 of the reformer 20 degrades over time. As the catalyst degrades, the concentration of CO and H2 in the reformate gas produced by the reforming reaction portion 23 also decreases. In this case, the desired torque is unable to be generated in the engine 1 and exhaust gas emissions may deteriorate. In order to have the engine 1 and the vehicle C operate stably, it is necessary to accurately determine the extent of degradation of the reforming catalyst in the reformer 20. Based on this, in the vehicle C, the temperature sensor 12, which is located in the reformer 20, and the ECU 50 are designed to function as the reforming catalyst degradation determining apparatus. The ECU 50 serves as a determining portion that executes a reforming catalyst degradation determining routine shown in FIG. 4 at predetermined intervals of time while the reformer 20 is operating.

Figure 4:
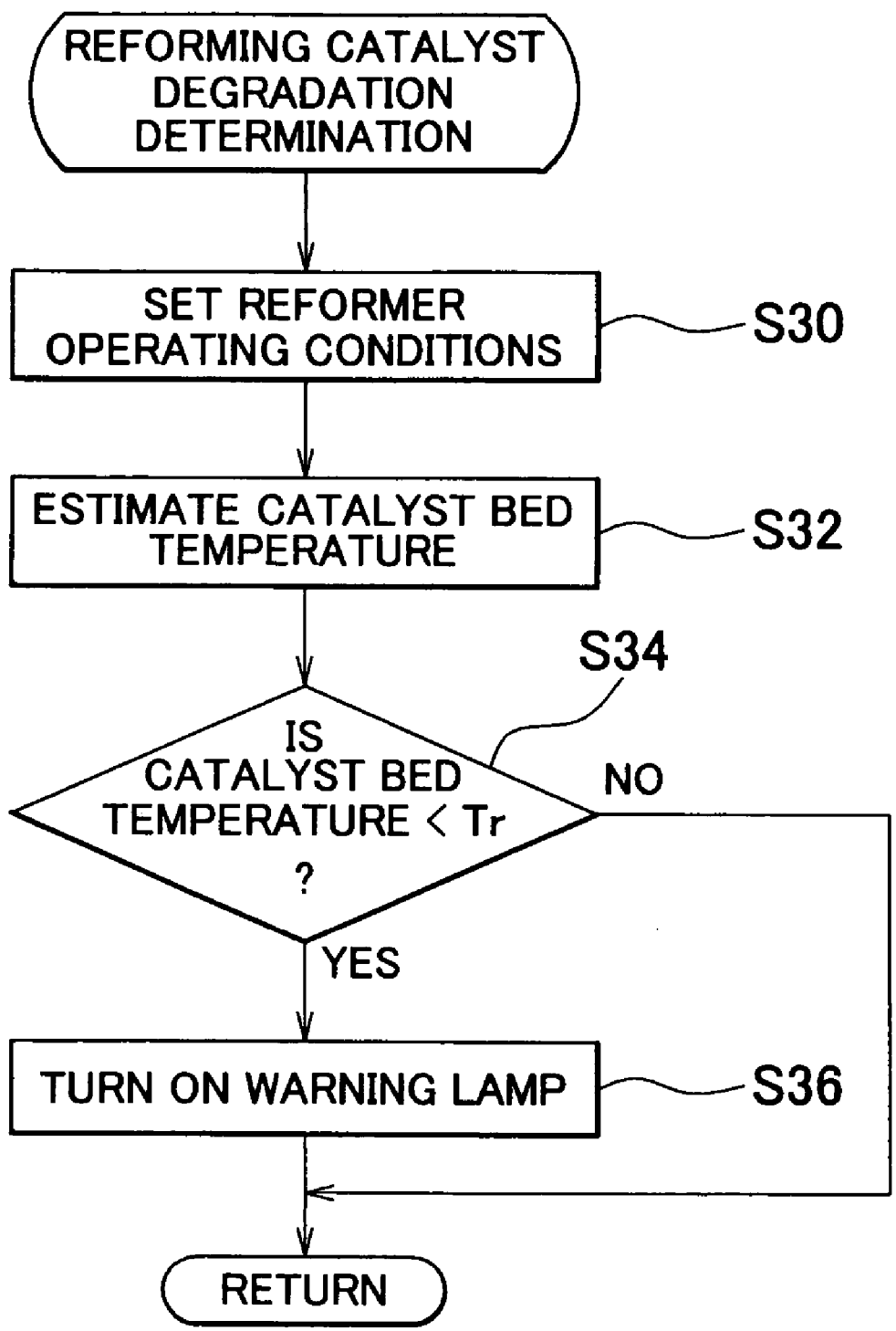
FIG. 4 is a flowchart illustrating a reforming catalyst degradation determining routine according to the first exemplary embodiment of the invention.

As shown in FIG. 4, at the timing when the reforming catalyst degradation determining routine is executed, the ECU 50 sets operating conditions (i.e., parameters) of the reformer 20, such as the air-fuel ratio and supply quantity of the mixture to be supplied to the reformer 20, to values to be used in the catalyst degradation determining routine (e.g., sets the air-fuel ratio of the mixture to AFr and the supply quantity of the mixture to a predetermined value) (step S30). The ECU 50 then estimates (detects) the catalyst bed temperature at the reforming reaction portion 23 of the reformer 20 (such as the average temperature of the reforming reaction portion 23) based on a signal received from the temperature sensor 12 located in the reformer 20 (step S32). After estimating the catalyst bed temperature at the reforming reaction portion 23, the ECU 50 compares the detected catalyst bed temperature with a predetermined reference temperature Tr (step S34).

Figure 5:
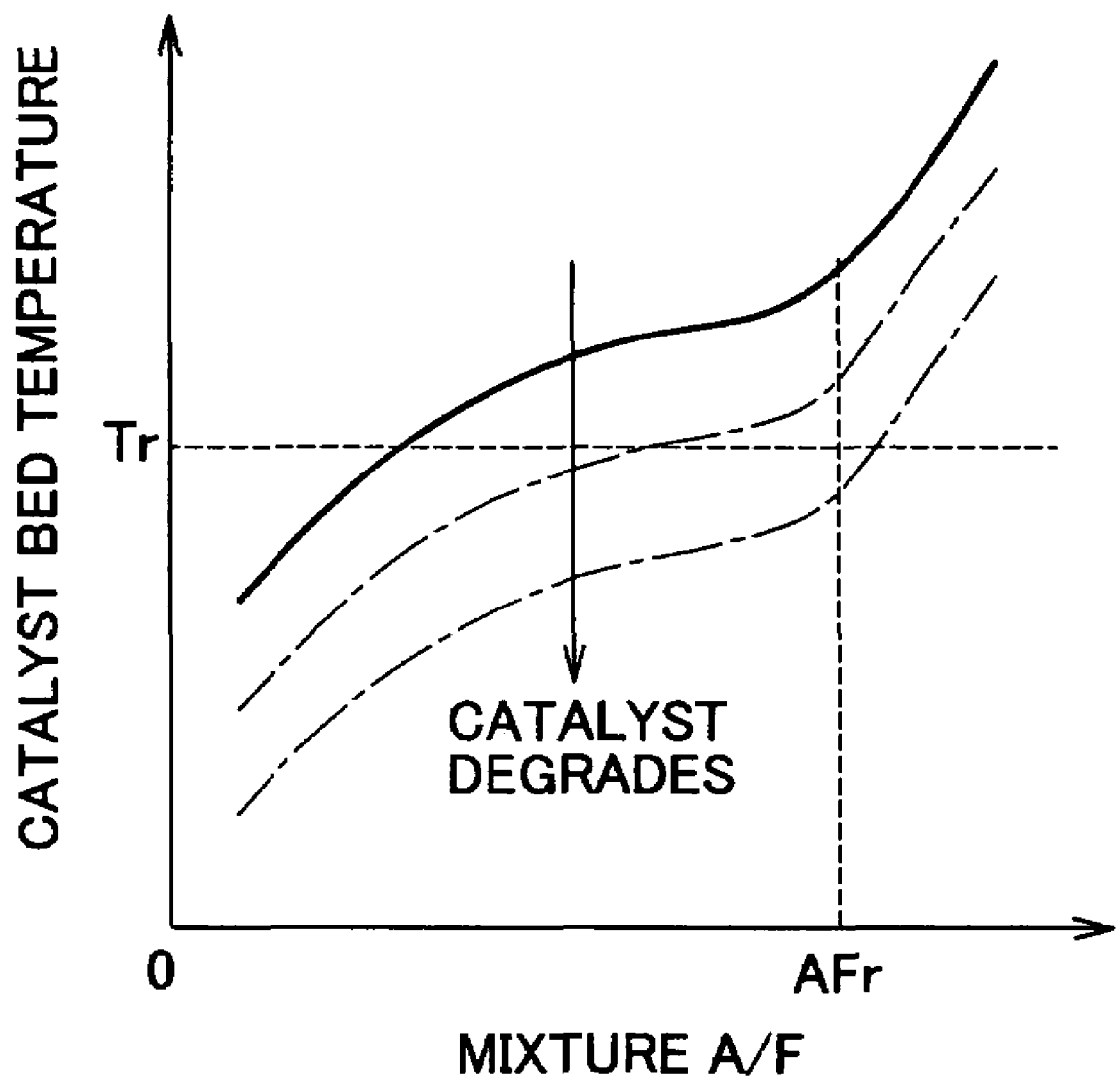
FIG. 5 is a graph showing the correlative relationship between the catalyst floor temperature and the extent of degradation of the reforming catalyst.

There is a correlative relationship between the catalyst bed temperature (i.e., the temperature of the reforming catalyst) and the extent of degradation of the reforming catalyst, as shown in FIG. 5. FIG. 5 is a graph showing the relationship between the air-fuel ratio of the mixture supplied to the reformer 20 and the catalyst temperature (e.g., the average temperature of the reforming reaction portion 23) increase during a reforming reaction. As can be understood from the drawing, when the air-fuel ratio of the mixture supplied to the reformer 20 is a constant value AFr, the catalyst bed temperature during a reforming reaction decreases as the catalyst degrades. The solid line in the drawing shows the catalyst functioning normally (i.e., not degraded) and the chain single and double dashed lines in the drawing show the catalyst bed temperature as the degradation of the catalyst progresses.

In view of this, in the vehicle C in this exemplary embodiment, the reference temperature Tr is determined in advance based on test data and the like. The reference temperature Tr is a lower limit value by which it is possible to confirm that the reforming catalyst is operating normally when the air-fuel ratio of the mixture supplied to the reformer 20 is the value AFr during the determination to determine whether the reforming catalyst is degraded (hereinafter also referred to as "reforming catalyst degradation determination"). The reference temperature Tr is stored in the storage device of the ECU 50. If the catalyst bed temperature estimated in step S32 is lower than the reference temperature Tr, the ECU 50 determines that the reforming catalyst is degraded (step S34), and the ECU 50 turns on a predetermined warning lamp 53 provided in the vehicle C in step S36. Alternatively in step S36, instead of, or in addition to, the ECU 50 turning on the warning lamp, the ECU 50 may record the fact that the catalyst is degraded in a predetermined region of the storage device. If it is determined in step S34 that the estimated value of the catalyst bed temperature is greater than the reference temperature Tr, the ECU 50 regards this to mean that the reforming catalyst is not degraded, and then waits for the reforming catalyst degradation determining routine to be executed again.

Accordingly in the vehicle C in this exemplary embodiment, the ECU 50 determines the extent of degradation of the reforming catalyst based on the catalyst bed temperature detected by the temperature sensor 12. Also, the catalyst bed temperature at the reforming reaction portion 23 is also able to be detected relatively easily and accurately within various parameters relating to the reforming catalyst. Therefore, in the vehicle C in this exemplary embodiment, it is possible to accurately determine whether the reforming catalyst in the reforming reaction portion 23 is degraded. Furthermore, the temperature sensor is provided in the reformer 20 of the vehicle C in order to set the air-fuel ratio of the mixture supplied to the reforming reaction portion 23 based on the catalyst bed temperature. This obviates the need to separately provide a dedicated temperature sensor for determining whether the reforming catalyst is degraded, which in turn enables cost increases and the like to be kept to the necessary minimum while still making it possible to determine whether the reforming catalyst is degraded.

Figure 6:
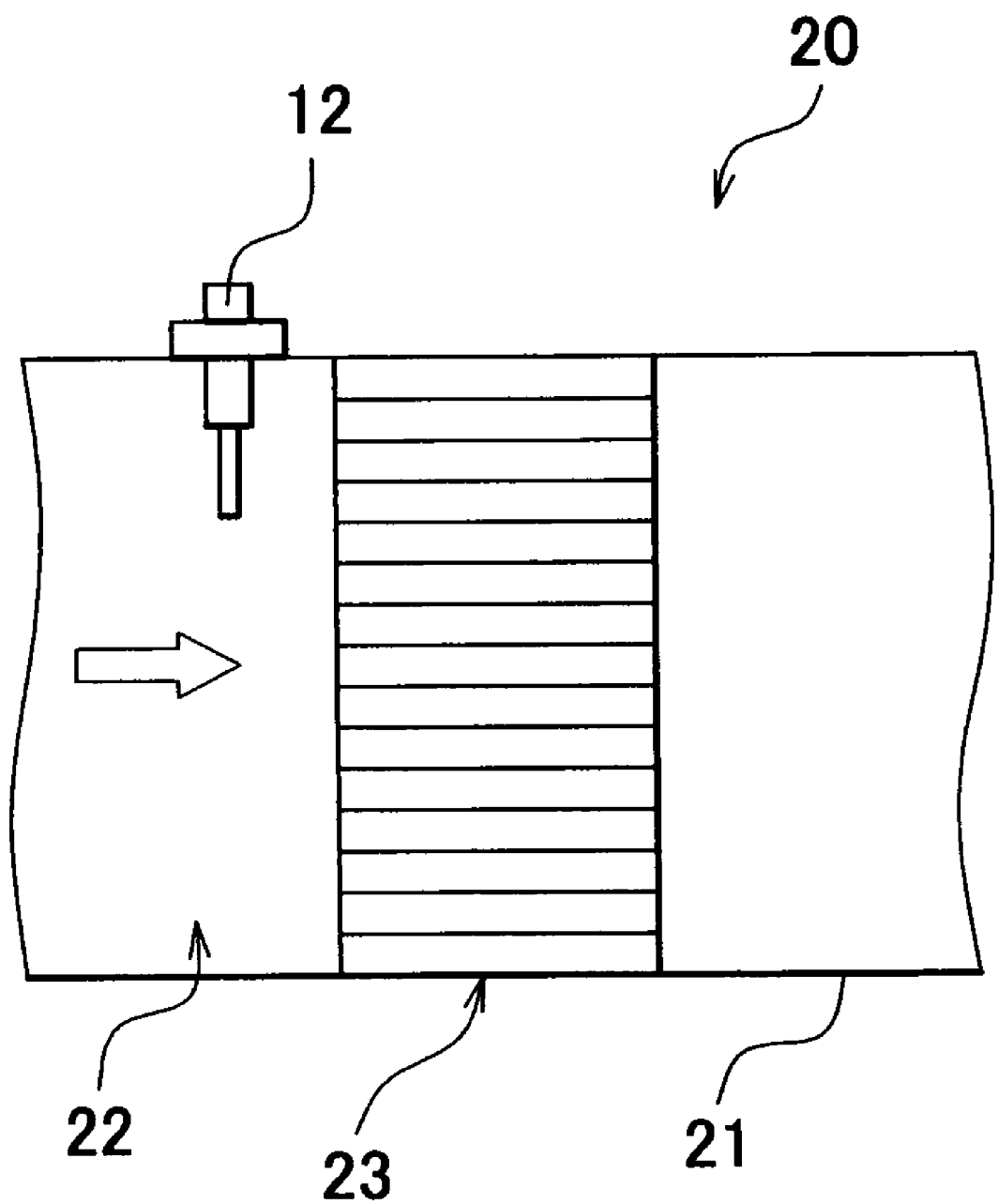
FIG. 6 is a representative view of a modified example of the first exemplary embodiment of the invention.
Figure 7:
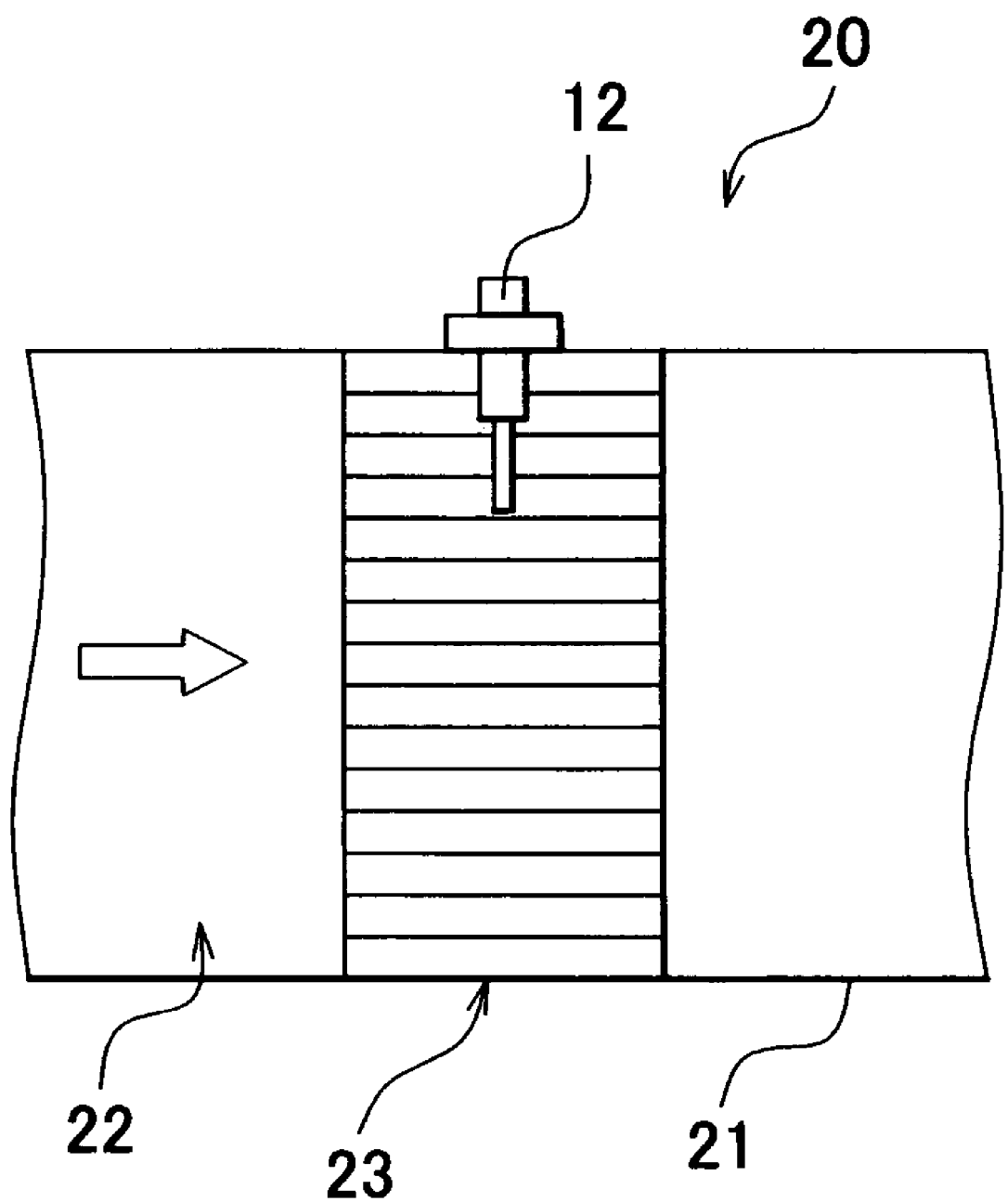
FIG. 7 is a representative view of another modified example of the first exemplary embodiment of the invention.

In this exemplary embodiment, the temperature sensor 12 may also be mounted to the main body 21 (on the inside of the air-fuel mixing portion 22) at a location upstream of the reforming reaction portion 23, as shown in FIG. 6. The catalyst bed temperature (e.g., the average temperature) of the reforming reaction portion 23 may also be estimated from the detection value from the temperature sensor 12 located upstream of the reforming reaction portion 23. Alternatively, the temperature sensor 12 may be mounted near a central portion, in the direction of flow of the air-fuel mixture, of the reforming reaction portion 23 and used to directly measure (detect) the temperature of the reforming catalyst.

Figure 8:
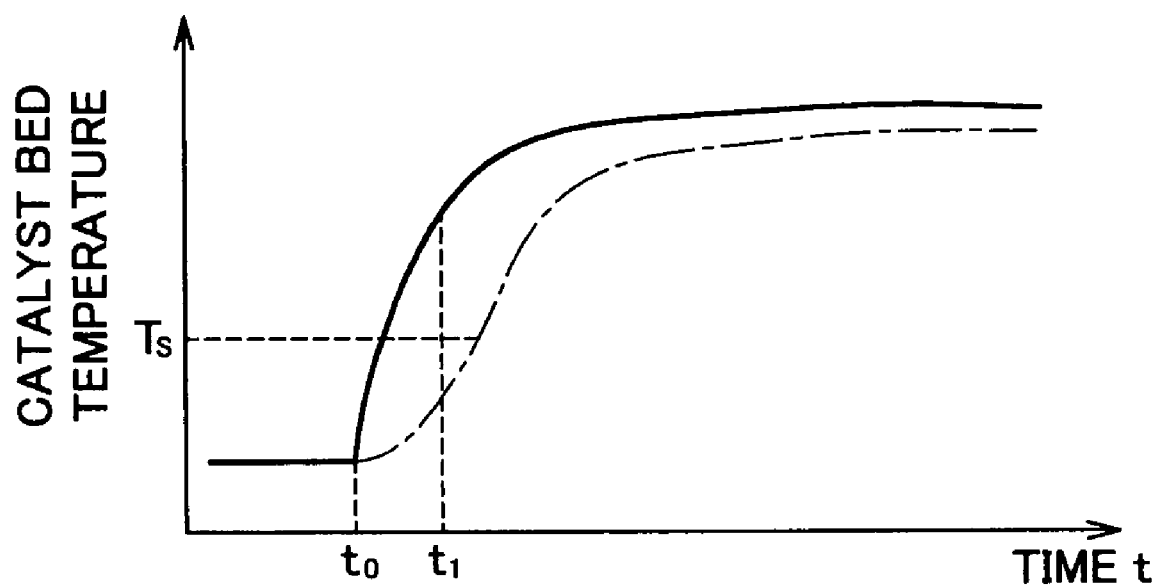
FIG. 8 is a graph for explaining another modified example of the first exemplary embodiment of the invention.

FIG. 8 is a graph showing a modified example of the first exemplary embodiment of the invention. Typically, the reactivity of the fuel and air mixture in the reforming catalyst declines as the reforming catalyst degrades. Therefore, in this modified example, the rate of increase in the temperature (i.e., the rate of temperature change) at a certain location of the reforming catalyst after the air-fuel mixture has started to be supplied is measured. In FIG. 8, time t0 indicates the start of mixture supply and the time at which the temperature starts to rise. Under the same operating conditions, the rate of increase in temperature at a certain location of the reforming catalyst is less when the reforming catalyst is degraded (see the chain single dashed line in the drawing) than it is when the reforming catalyst is operating normally (see the solid line in the drawing).

Therefore, instead of determining the extent of degradation of the reforming catalyst according to the method illustrated in FIG. 4, the rate of degradation of the reforming catalyst may also be determined based on the rate of increase in the catalyst bed temperature (e.g., the average temperature of the reforming reaction portion 23) after the air-fuel mixture has started to be supplied to the reforming catalyst. In this case, it can be determined that the reforming catalyst is degraded if the rate of increase in the catalyst bed temperature is slower than a predetermined rate. Accordingly, it is possible to easily and accurately determine whether the reforming catalyst is degraded.

When this method is applied in the vehicle C, the ECU 50 estimates the catalyst bed temperature at the reforming reaction portion 23 based on a signal received from the temperature sensor 12 at the point (i.e., at time t1 in FIG. 8) after a predetermined period of time has passed from time t0, which is when the mixture started to be supplied to the reforming catalyst. The ECU 50 then determines whether that estimated catalyst bed temperature is less than a predetermined temperature Ts. If the estimated value of the catalyst bed temperature is less than the temperature Ts at time t1, the ECU 50 determines that the reforming reaction portion 23 is degraded.

The determination as to whether the rate of increase in the catalyst bed temperature is less than a predetermined rate may also be made according to the following method. In this case, the ECU 50 starts to supply the mixture at time t0. The ECU 50 then estimates the catalyst bed temperature at the reforming reaction portion 23 based on a signal received from the temperature sensor 12, and measures the time it takes for the estimated value of the catalyst temperature to reach the predetermined temperature Ts from time t0. At the point when the estimated value of the catalyst temperature reaches the temperature Ts, the ECU 50 determines whether the time it took for the estimated value of the catalyst temperature to reach the temperature Ts from time t0 is greater than a predetermined reference time (i.e., t1−t0 in the example shown in FIG. 8). The ECU 50 determines the reforming catalyst to be degraded if the time it takes the estimated value of the catalyst temperature to reach the temperature Ts after the mixture had started to be supplied is greater than the reference time.

Second Exemplary Embodiment

A second exemplary embodiment of the invention will now be described with reference to FIGS. 9 to 12. Elements in the second exemplary embodiment which are the same as those in the first exemplary embodiment will be denoted by the same reference numerals, and redundant descriptions thereof will be omitted.

The partial oxidation reaction in Expression 1 above that progresses in the reforming reaction portion 23 of the reformer 20 according to the invention progresses as an extremely fast rate. Therefore, when the reforming catalyst is not degraded (i.e., when the reforming catalyst is operating normally), a large portion of the fuel and air mixture reacts at the end portion on the upstream side, in the direction of flow of the mixture, (i.e., in the "upstream region") of the reforming catalyst. Therefore, in a reforming catalyst that is not degraded (shown by the solid line in FIG. 9), the temperature at the downstream end portion (i.e., the downstream region) of the reforming catalyst is lower than it is at the upstream end portion during a reforming reaction.

With extended use, the upstream end portion of the reforming catalyst begins to degrade first. As a result, the fuel and air mixture starts to react at the downstream region (end portion), in the direction of flow of the mixture, of the reforming catalyst. In comparing a reforming catalyst that is not degraded (shown by the solid line in FIG. 9) and a reforming catalyst that is degraded (shown by the chain single dashed line in FIG. 9) under the same operating conditions of the reformer 20, it is evident from FIG. 9 that the temperature at a certain location on the downstream side of the degraded reforming catalyst is higher during the reforming reaction than it is at the same location in the reforming catalyst that is operating normally.

In view of this, according to this exemplary embodiment, the temperature at the end portion on the downstream side, in the direction of flow of the mixture, of the reforming catalyst (i.e., the reforming reaction portion 23) is detected by the temperature sensor 12 (see FIG. 1) provided downstream of the reforming reaction portion 23. The rate of degradation of the reforming catalyst is then able to be determined based on that detected temperature of the downstream end portion of the reforming catalyst.

Figure 10:
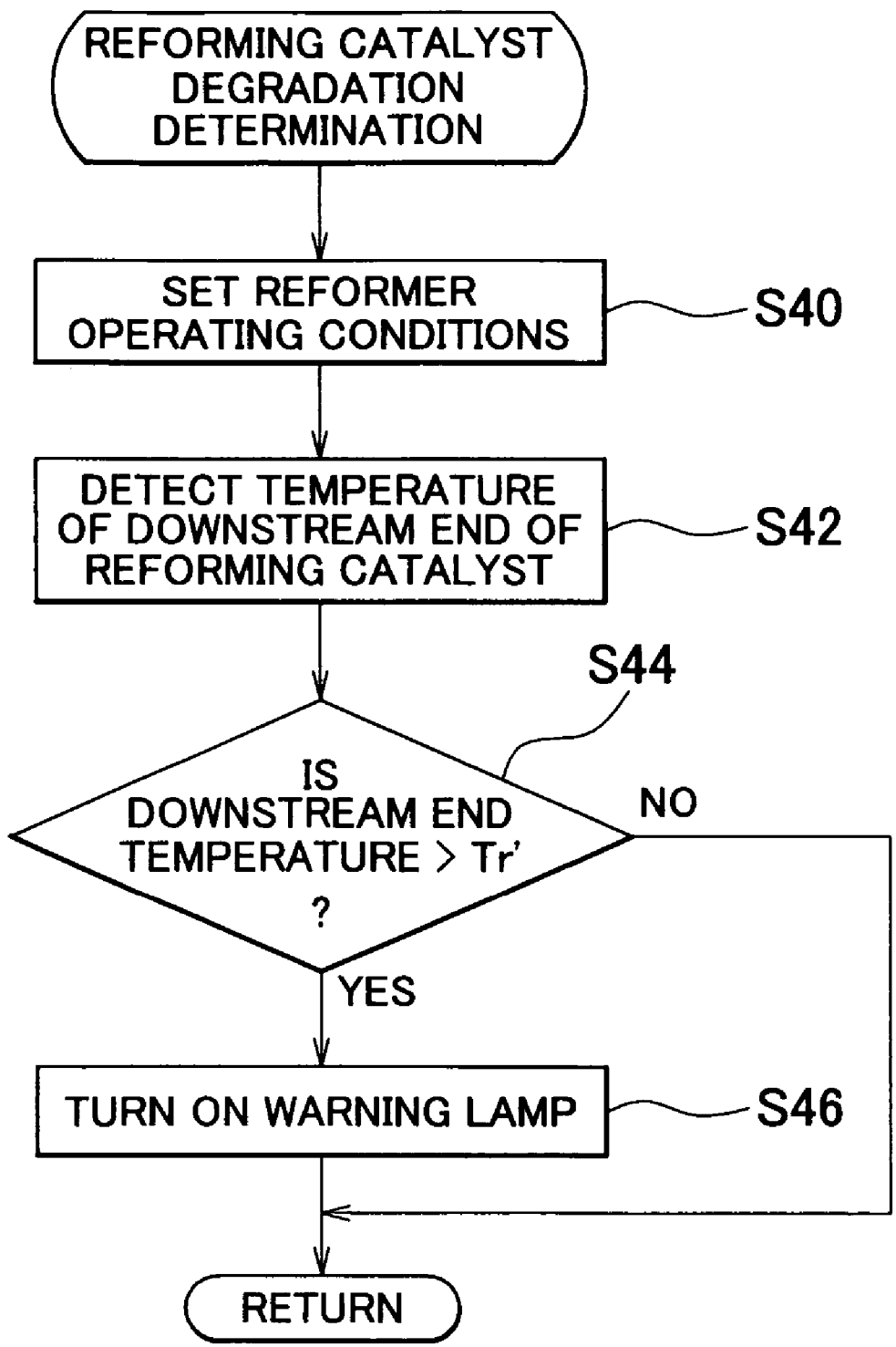
FIG. 10 is a flowchart illustrating a reforming catalyst degradation determining routine according to the second exemplary embodiment of the invention.

In this exemplary embodiment, at the timing when the reforming catalyst degradation determining routine is executed, the ECU 50 sets operating conditions (i.e., parameters) of the reformer 20, such as the air-fuel ratio and supply quantity of the mixture to be supplied to the reformer 20, to values to be used in the catalyst degradation determining routine (e.g., sets the air-fuel ratio of the mixture to AFr and the supply quantity of the mixture to a predetermined value), as shown in FIG. 10 (step S40). The ECU 50 then detects (estimates) the temperature at the downstream end portion (a position a predetermined distance away from the farthest upstream end of the reforming reaction portion 23) of the reforming reaction portion 23 (i.e., the reforming catalyst) based on a signal received from the temperature sensor 12 located in the reformer 20 (step S42). After detecting the temperature of the downstream end portion of the reforming reaction portion 23, the ECU 50 compares the detected temperature of the downstream end portion with a predetermined reference temperature Tr' (step S44). The reference temperature Tr' is determined beforehand, based on test data and the like, as a temperature of the downstream end portion when the air-fuel ratio of the mixture supplied to the reformer 20 is the value AFr during the reforming catalyst degradation determination, and it has been confirmed that the reforming catalyst is operating normally. The reference temperature Tr' is stored in the storage device of the ECU 50.

If the temperature of the downstream end portion of the reforming reaction portion 23 is higher than the reference temperature Tr, the ECU 50 determines that the reforming catalyst is degraded (step S44), and turns on the predetermined warning lamp 53 provided in the vehicle C (step S46). On the other hand, if it is determined in step S44 that the temperature of the downstream end portion of the reforming reaction portion 23 is lower than the reference temperature Tr, the ECU 50 regards this to mean that the reforming catalyst is not degraded, and then waits for the reforming catalyst degradation determining routine to be executed again. Accordingly, it is also possible to reliably detect whether the reforming catalyst is degraded by determining the extent of degradation of the reforming catalyst based on the temperature of the downstream end portion of the reforming reaction portion 23 (i.e., the reforming catalyst).

Figure 11:
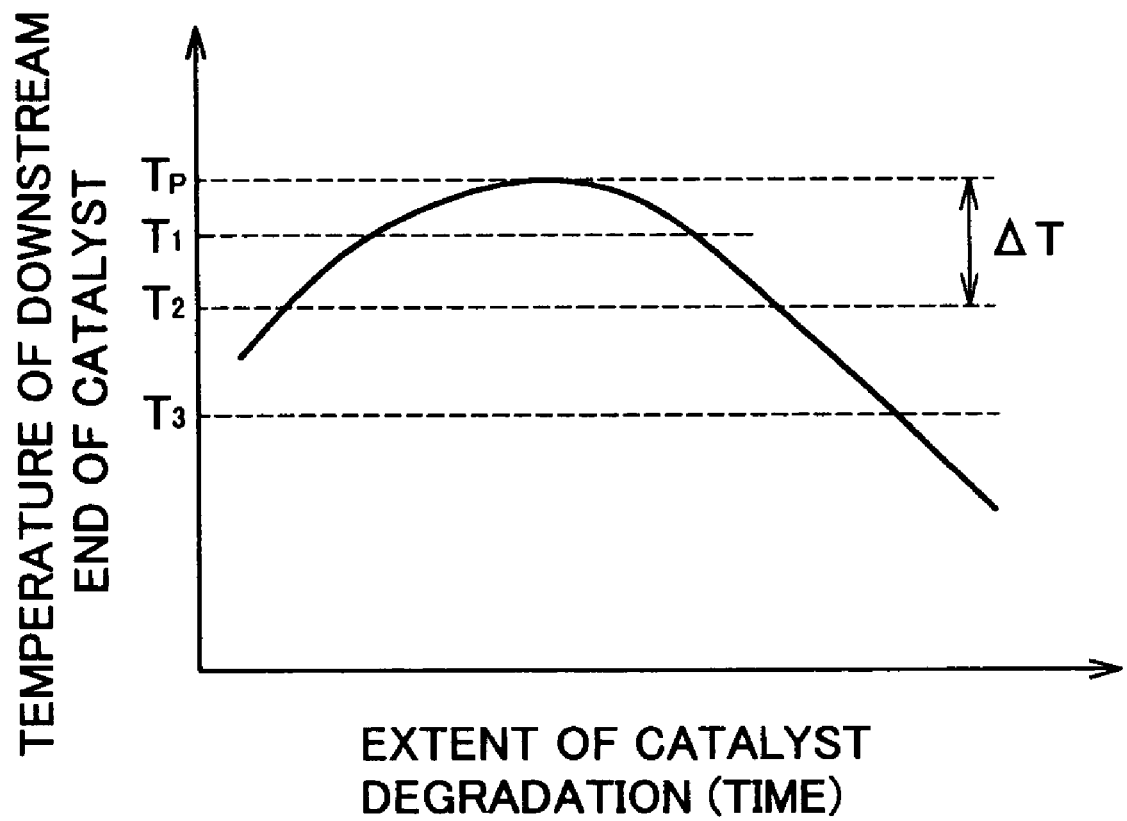
FIG. 11 is a graph for explaining a modified example of the second exemplary embodiment of the invention.
Figure 12:
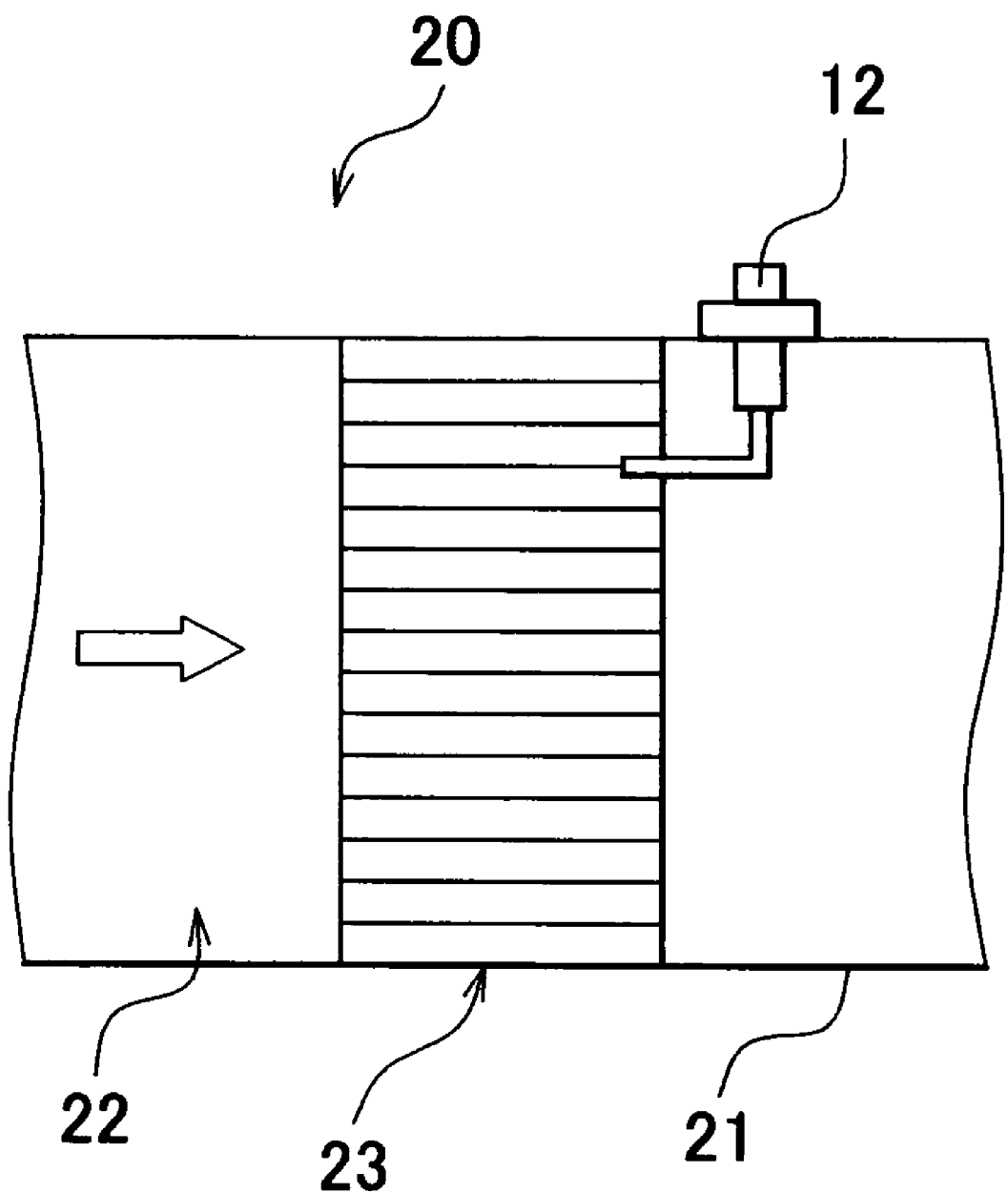
FIG. 12 is a representative view of a modified example of the second exemplary embodiment of the invention.

If the reforming catalyst is degraded, such that the reforming reaction starts to occur at the downstream end portion of the reforming catalyst, the temperature of the downstream end portion of the reforming catalyst increases, as described above, until it reaches a peak value Tp, as shown in FIG. 11. Therefore, in step S44 in FIG. 10, it may also be determined whether the temperature of the downstream end portion of the reforming reaction portion 23 is above a temperature T1 that is a predetermined temperature lower than the peak value Tp, for example. In this case, if the temperature is above the temperature T1 that is a predetermined temperature lower than the peak value Tp, for example, the entire reforming catalyst is regarded to have degraded.

When the reforming reaction starts to occur at the downstream end portion of the reforming catalyst, the downstream end portion of the reforming catalyst also degrades over time. As shown in FIG. 11, after reaching the peak value Tp, the temperature of the downstream end portion of the reforming catalyst begins to drop. In consideration of this, the temperature of the downstream end portion of the reforming catalyst detected by the temperature sensor 12 may be monitored, and the entire reforming catalyst may be regarded to have degraded if, after reaching the peak value Tp, the temperature of the downstream end portion of the reforming catalyst then drops by a predetermined temperature $\Delta T$ from the peak value Tp (i.e., when the temperature has dropped to temperature T2 in FIG. 11).

Furthermore, as is shown in FIG. 11, when the downstream end portion of the reforming catalyst has degraded a certain extent, the temperature of the downstream end portion of the reforming catalyst drops below a lower limit value T3 above which the reforming catalyst is considered to be operating normally. Accordingly, the temperature of the downstream end portion of the reforming catalyst detected by the temperature sensor 12 may be monitored and the entire reforming catalyst may be regarded to have degraded at the point when the temperature of the downstream end portion of the reforming catalyst drops below the lower limit value T3.

These methods also enable easy and accurate determination as to whether the reforming catalyst is degraded. The temperature sensor 12 may also be disposed in the reformer 20 as shown in FIG. 20, and the temperature of the downstream end portion of the reforming reaction portion 23 (i.e., reforming catalyst) may be measured (detected) directly by the temperature sensor 12.

Third Exemplary Embodiment

Figure 13:
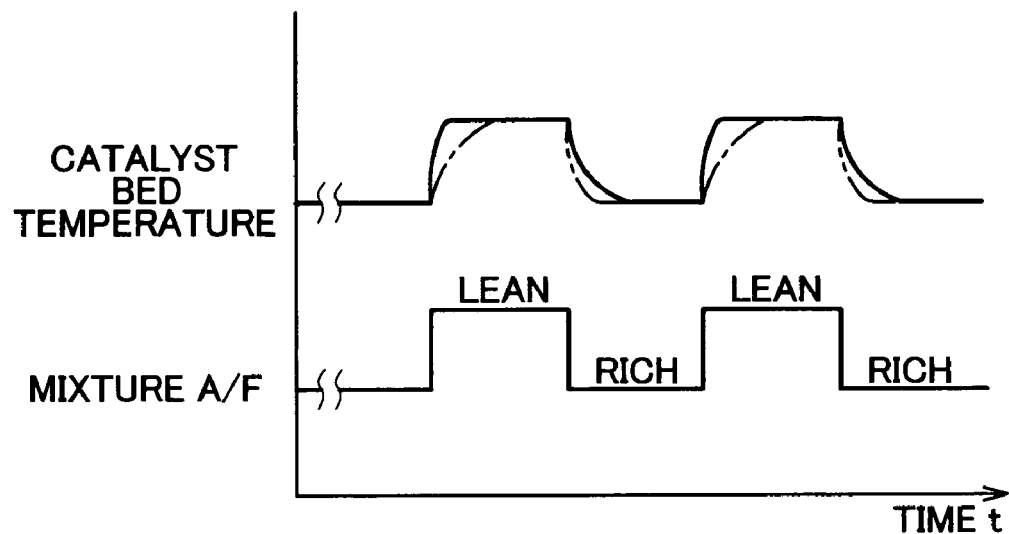
FIG. 13 is a graph for explaining a third exemplary embodiment of the invention.

A third exemplary embodiment of the invention will now be described with reference to FIGS. 13 and 14. Elements in the third exemplary embodiment which are the same as those in the first exemplary embodiment will be denoted by the same reference numerals, and redundant descriptions thereof will be omitted.

In the reformer 20 which produces reformate gas that includes CO and H2 through the partial oxidation reaction shown in Expression 1, the catalyst bed temperature (e.g., the average temperature of the reforming reaction portion 23) increases when the mixture to be supplied to the reforming catalyst becomes leaner than a predetermined ratio (i.e., when the value of the air-fuel ratio of the mixture at a given point becomes larger than it has been previously). In this case, if the reforming catalyst is degraded, the rate of increase in the catalyst bed temperature after the air-fuel ratio of the mixture is changed is slower (as shown by the dashed line in FIG. 13) than it is when the reforming catalyst is operating normally (as shown by the solid line in the same drawing).

When the mixture in the reformer which is to be supplied to the reforming catalyst 20 becomes richer than a predetermined ratio (i.e., when the value of the air-fuel ratio of the mixture at a given point becomes less than it has been previously), the catalyst bed temperature (e.g., the average temperature of the reforming reaction portion 23) decreases. In this case, if the reforming catalyst is degraded, the rate of decrease in the catalyst bed temperature after the air-fuel ratio of the mixture is changed is faster (as shown by the double dashed line in FIG. 13) than it is when the reforming catalyst is operating normally (as shown by the solid line in the same drawing).

In consideration of this, the air-fuel mixture to be supplied to the reformer 20 is made alternately lean and rich at predetermined intervals of time, for example. Accordingly, it is also possible to accurately detect degradation of the reforming catalyst by determining the extent of degradation of the reforming catalyst based on the rate of increase or decrease in the catalyst temperature after the air-fuel ratio of the mixture has been changed.

When this method is applied in the vehicle C, the ECU 50 controls the opening amount of the flowrate regulator valve 11 and the fuel injection quantity injected from the fuel injection valve 15 at the timing for executing the reforming catalyst degradation determining routine, so as to make the mixture supplied to the reformer 20 lean (or rich). At the point when a predetermined period of time has passed after the mixture for the reforming catalyst was made lean (or rich), the ECU 50 estimates the catalyst bed temperature based on a signal received from the temperature sensor 12. The ECU 50 then determines whether the estimated catalyst bed temperature at the reforming reaction portion 23 is less than a predetermined temperature. If the estimated value of the catalyst bed temperature is less than the predetermined temperature, the ECU 50 determines that the reforming catalyst is degraded.

The determination in this exemplary embodiment as to whether the reforming catalyst is degraded may also be made according to the following method. In this case as well, the ECU 50 controls the opening amount of the flowrate regulator valve 11 and the fuel injection quantity injected from the fuel injection valve 15 at the timing for executing the reforming catalyst degradation determining routine, so as to make the mixture supplied to the reformer 20 lean (or rich). The ECU 50 then estimates the catalyst bed temperature at the reforming reaction portion 23 based on a signal received from the temperature sensor 12, and measures the time it takes for the estimated value of the catalyst temperature to reach a predetermined temperature after the mixture supplied to the reformer 20 was made lean or rich. At the point where the estimated value of the catalyst temperature reaches the predetermined temperature, the ECU 50 compares the time that it took the estimated value of the catalyst temperature to reach the predetermined temperature from the time the air-fuel ratio of the mixture was changed, with a predetermined reference time.

If, when the mixture for the reformer 20 has been made lean, the time that it takes for the estimated value of the catalyst temperature to reach (i.e., to rise to) the predetermined temperature after the air-fuel ratio of the mixture was changed is greater than the reference time, then the rate of increase in the catalyst bed temperature is slower than it would be if the reforming catalyst were operating normally. Therefore, it can be determined that the reforming catalyst is degraded. Meanwhile, if, when the mixture for the reformer 20 has been made rich, the time that it takes for the estimated value of the catalyst temperature to reach (i.e., to drop to) the predetermined temperature after the air-fuel ratio of the mixture was changed is less than the reference time, then the rate of decrease in the catalyst bed temperature is faster than it would be if the reforming catalyst were operating normally. Therefore, it can be determined that the reforming catalyst is degraded.

Figure 14:
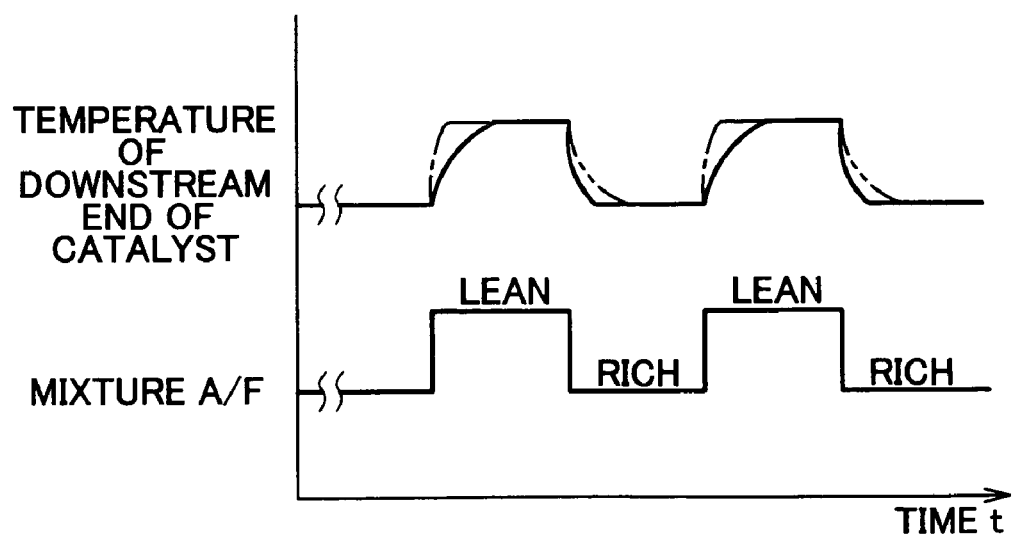
FIG. 14 is a graph for explaining a modified example of the third exemplary embodiment of the invention.

FIG. 14 is a time chart showing a modified example of the third exemplary embodiment of the invention. If the mixture in the reformer 20 that is to be supplied to the reforming catalyst is leaner than a predetermined ratio (i.e., if the air-fuel ratio of the mixture has been increased) and the upstream end portion of the reforming catalyst is degraded, then the rate of increase in the temperature at the downstream end portion of the reformer 20 after the air-fuel ratio of the mixture is changed is faster (as shown by the dashed line in FIG. 14) than it is when the reforming catalyst is operating normally (shown by the solid line in FIG. 14).

Further, if the mixture in the reformer 20 that is to be supplied to the reforming catalyst is richer than a predetermined ratio (i.e., if the air-fuel ratio of the mixture has been decreased) and the upstream end portion of the reforming catalyst is degraded, then the rate of decrease in the temperature at the downstream end portion of the reforming catalyst after the air-fuel ratio of the mixture is changed is slower (as shown by the double dashed line in FIG. 14) than it is when the reforming catalyst is operating normally (shown by the solid line in FIG. 14).

In consideration of this, therefore, the mixture supplied to the reformer 20 is made lean or rich at predetermined intervals of time while the temperature of the downstream end portion of the reforming reaction portion 23 (i.e., reforming catalyst) detected by the temperature sensor 12 is monitored, for example. Accordingly, it is possible to accurately detect degradation of the reforming catalyst by determining the extent of degradation of the reforming catalyst based on the rate of increase or decrease in the temperature of the downstream end portion of the reforming reaction portion 23 after the air-fuel ratio of the mixture has been changed.

Fourth Exemplary Embodiment

A fourth exemplary embodiment of the invention will now be described with reference to FIGS. 15 and 17. Elements in the fourth exemplary embodiment which are the same as those in the first exemplary embodiment will be denoted by the same reference numerals, and redundant descriptions thereof will be omitted.

Figure 9:
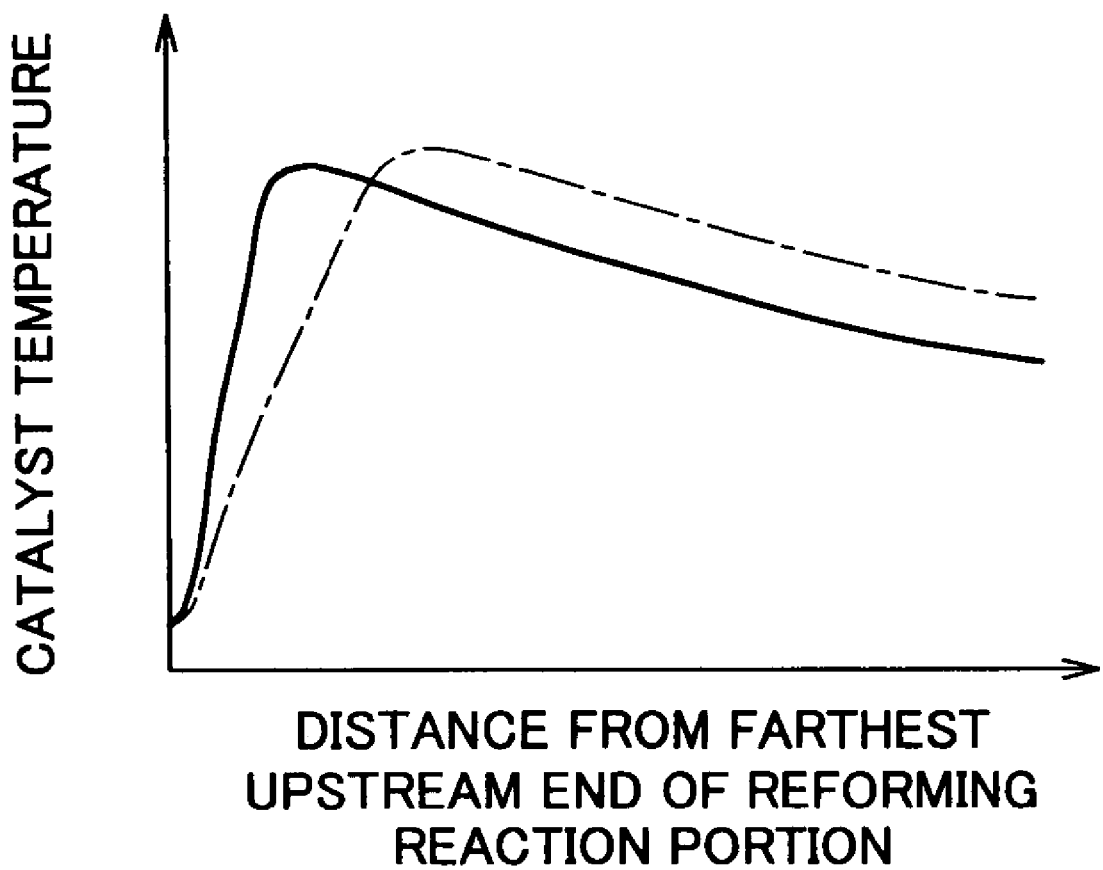
FIG. 9 is a graph showing the relationship between the distance from the farthest upstream end of a reforming reaction portion of the reformer and the temperature of the reforming catalyst according to a second exemplary embodiment of the invention.
Figure 15:
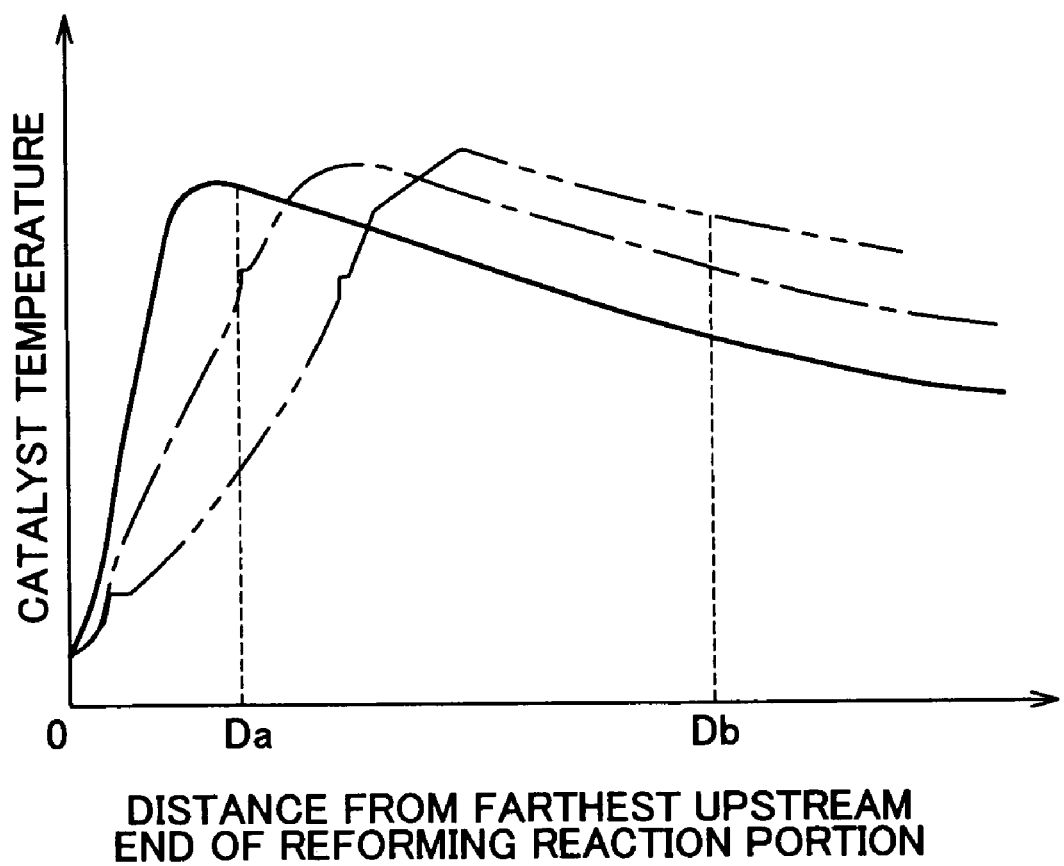
FIG. 15 is a graph showing the relationship between the distance from the farthest upstream end of the reforming reaction portion of the reformer and the temperature of the reforming catalyst according to a fourth exemplary embodiment of the invention.

Similar to FIG. 9, FIG. 15 is a graph showing the relationship between the distance from the farthest upstream end of the reforming reaction portion 23 and the temperature of the reforming catalyst. As described above, when the reforming catalyst degrades, the reforming reactions starts to occur at the downstream end portion of the reforming catalyst. Accordingly, as shown in FIG. 15, a temperature difference between an upstream end portion Pa of the reforming reaction portion 23 (i.e., the reforming catalyst) and a downstream end portion Pb of the reforming reaction portion 23 when the reforming catalyst is operating normally (i.e., when the reforming catalyst is not degraded; shown by the solid line in the drawing) becomes smaller as the reforming catalyst degrades (shown by the chain single and double dashed lines in the drawing). As the reforming catalyst continues to degrade, it reaches a point where the temperature of the downstream end portion Pb of the reforming reaction portion 23 becomes higher than the temperature of the upstream end portion Pa of the reforming reaction portion 23. The upstream end portion Pa of the reforming reaction portion 23 is located a distance Da away from the farthest upstream end of the reforming reaction portion 23 and the downstream end portion Pb of the reforming reaction portion 23 is located a distance Db away from the farthest upstream end of the reforming reaction portion 23.

Figure 16:
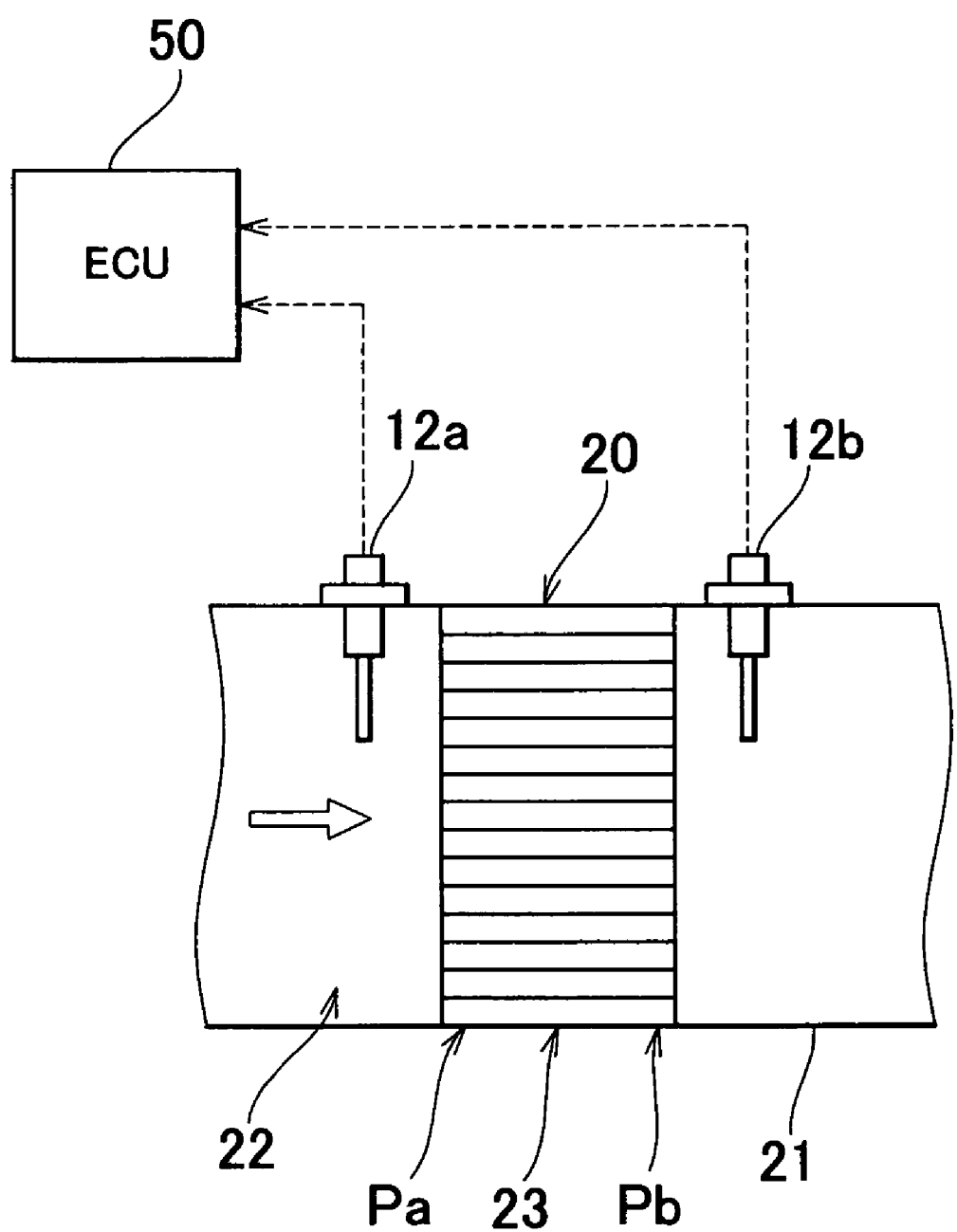
FIG. 16 is a representative view of a reformer according to the fourth exemplary embodiment of the invention.

In consideration of this, in this exemplary embodiment, a temperature sensor 12a and a temperature sensor 12b are mounted to the main body 21, as shown in FIG. 16. The temperature sensor 12a is positioned upstream of the reforming reaction portion 23 and the temperature sensor 12b is positioned downstream of the reforming reaction portion 23. The temperature sensor 12a on the upstream side detects the temperature of fluid flowing into the reforming reaction portion 23, while the temperature sensor 12b on the downstream side detects the temperature of reformate gas flowing out from the reforming reaction portion 23. The temperature sensors 12a and 12b output signals indicative of their respective detection values to the ECU 50. In this exemplary embodiment, the ECU 50 executes a reforming catalyst degradation determining routine shown in FIG. 17 at predetermined intervals of time while the reformer 20 is operating.

Figure 17:
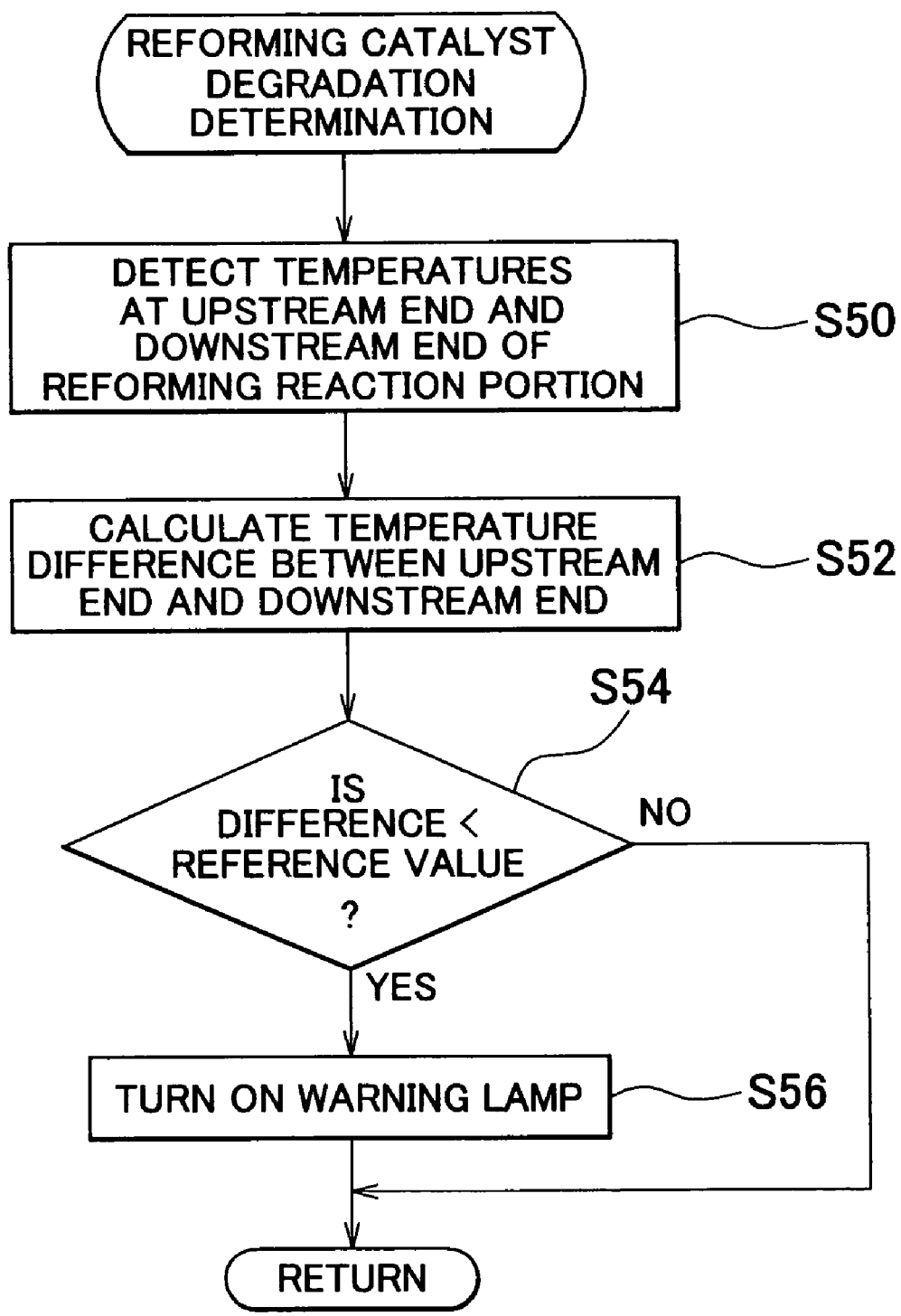
FIG. 17 is a flowchart illustrating a reforming catalyst degradation determining routine according to the fourth exemplary embodiment of the invention.

As shown in FIG. 17, at the timing at which the reforming catalyst degradation determining routine is executed, the ECU 50 estimates a temperature Ta at the upstream end portion Pa of the reforming reaction portion 23 (i.e., the reforming catalyst) and a temperature Tb at the downstream end portion Pb of the reforming reaction portion 23 based on signals received from the temperature sensors 12a and 12b provided in the reformer 20 (step S50). The ECU 50 then calculates the difference dT (=Ta−Tb) between the two temperatures by subtracting the temperature Tb of the downstream end portion Pb of the reforming reaction portion 23 from the temperature Ta of the upstream end portion of the reforming reaction portion 23 (step S52). The ECU 50 then compares the difference dT calculated in step S52 with a predetermined reference value dTr (step S54). This reference value dTr is set beforehand based on test data and the like, and stored in the storage device of the ECU 50.

If the difference dT between the temperature Ta of the upstream end portion Pa of the reforming reaction portion 23 (i.e., the reforming catalyst) and the temperature Tb of the downstream end portion Pb of the reforming reaction portion 23 is less than the predetermined reference value dTr, then the ECU 50 determines that the reforming catalyst is degraded (step S54) and turns on the predetermined warning lamp 53 provided in the vehicle C (step S56). If, on the other hand, the difference dT between the temperature Ta of the upstream end portion Pa of the reforming reaction portion 23 and the temperature Tb of the downstream end portion Pb of the reforming reaction portion 23 is greater than the predetermined reference value dTr, then the ECU 50 determines in step S54 that the reforming catalyst is not degraded and waits for the reforming catalyst degradation determining routine to be executed again.

Figure 18:
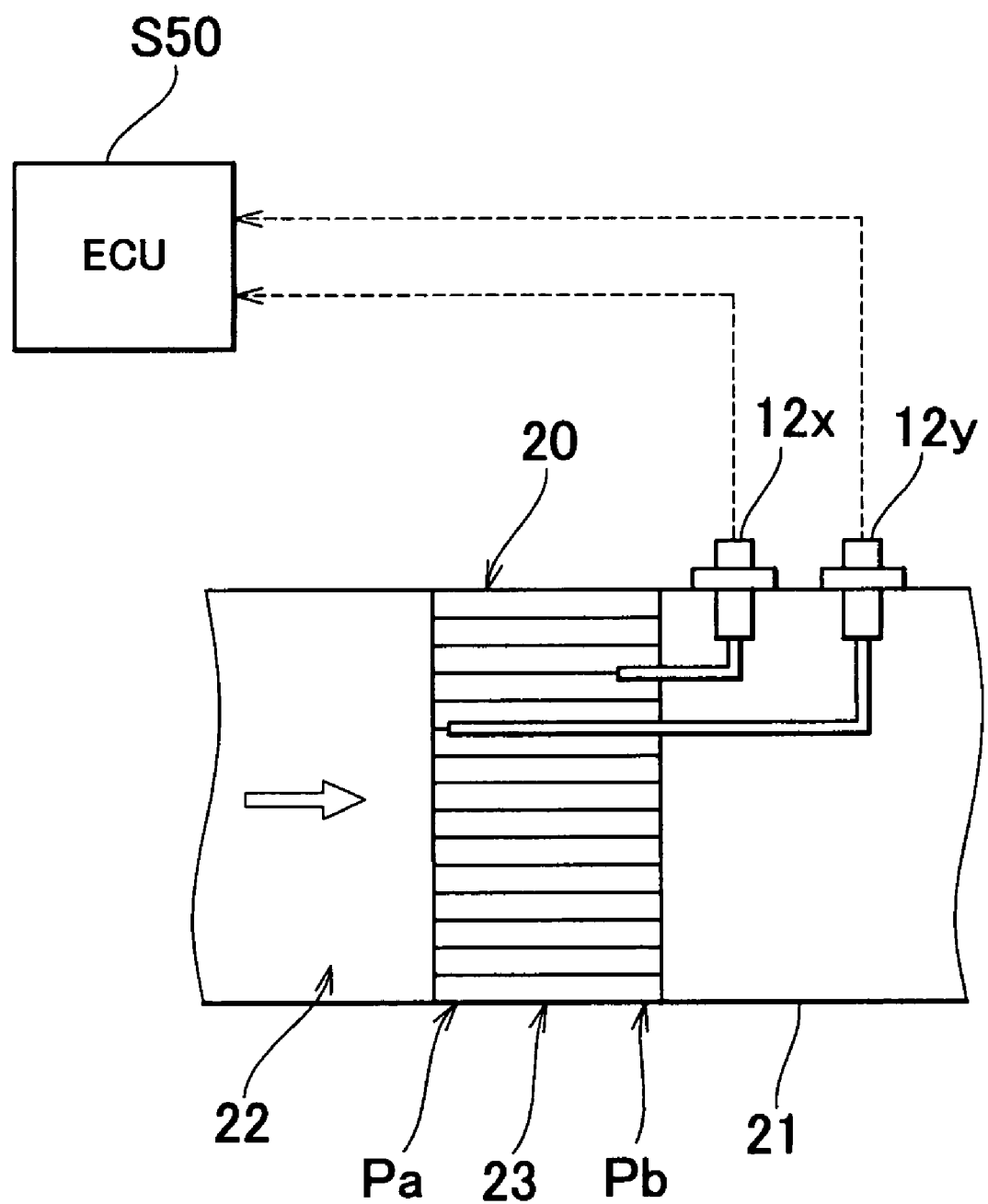
FIG. 18 is a representative view of a modified example of the fourth exemplary embodiment of the invention.

Accordingly, it is also possible to accurately determine whether the reforming catalyst is degraded by determining the extent of degradation of the reforming catalyst based on the difference dT between the temperature Ta of the upstream end portion Pa of the reforming reaction portion 23 and the temperature Tb of the downstream end portion Pb of the reforming reaction portion 23. When determining the extent of degradation of the reforming catalyst based on the temperature at a given location on the reforming catalyst (as in the first and second exemplary embodiments), it is necessary to have a process (e.g., step S30 in FIG. 4 and step S40 in FIG. 10) for making the operating conditions of the reforming catalyst constant (the same) before the temperature is detected in order to make a determination as to whether the catalyst is degraded. According to the fourth exemplary embodiment, however, this process is unnecessary, which facilitates execution of the degradation determining routine. As shown in FIG. 18, in this exemplary embodiment, temperature sensors 12x and 12y, which directly measure (i.e., detect) the temperature of the upstream and downstream end portions of the reforming reaction portion 23, may also be used.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

What is claimed is:

1. A reforming catalyst degradation determining apparatus which determines whether a reforming catalyst that reforms a mixture of air and fuel is degraded, comprising:
    a temperature sensor that detects a temperature of the reforming catalyst;
    an electronic control unit that determines that the reforming catalyst is degraded if a rate of increase in the detected temperature of the reforming catalyst after the mixture has started to be supplied to the reforming catalyst is slower than a predetermined rate; and
    a map defining a correlative relationship between the temperature of the reforming catalyst and an air-fuel ratio of the mixture, the map being stored in a storage device of the electronic control unit, wherein catalyst degradation is determined based on correlation between the rate of catalyst temperature increase and a change in the air-fuel ratio of the mixture.

2. The reforming catalyst degradation determining apparatus according to claim 1, wherein the electronic control unit determines that the reforming catalyst is degraded if the rate at which the temperature of the reforming catalyst detected by the temperature sensor rises, after the temperature of the reforming catalyst starts to rise, has not reached a predetermined rate.

3. The reforming catalyst degradation determining apparatus according to claim 2, wherein the electronic control unit determines that the rate at which the temperature of the reforming catalyst rises has not reached the predetermined rate if the temperature of the reforming catalyst has not reached a predetermined temperature at a predetermined time after the temperature of the reforming catalyst starts to rise.

4. The reforming catalyst degradation determining apparatus according to claim 2, wherein the electronic control unit determines that the rate at which the temperature of the reforming catalyst rises has not reached the predetermined rate, based on the time it takes for the temperature of the reforming catalyst to rise to a predetermined temperature after the temperature of the reforming catalyst starts to rise.

5. The reforming catalyst degradation determining apparatus according to claim 1, wherein the electronic control unit determines that the reforming catalyst is degraded if the rate at which the temperature of the reforming catalyst falls, after the temperature of the reforming catalyst starts to fall, is faster than a predetermined rate.

6. The reforming catalyst degradation determining apparatus according to claim 5, wherein the electronic control unit determines that the rate at which the temperature of the reforming catalyst falls is faster than the predetermined rate, based on the time it takes the temperature of the reforming catalyst to fall, after the temperature of the reforming catalyst starts to fall, to a predetermined temperature.

7. The reforming catalyst degradation determining apparatus according to claim 1, wherein the electronic control unit determines whether the reforming catalyst is degraded based on the time it takes the temperature of the reforming catalyst to rise to a predetermined temperature after the temperature of the reforming catalyst starts to rise and the time it takes the temperature of the reforming catalyst to fall to a predetermined temperature after the temperature of the reforming catalyst starts to fall.

8. A fuel reforming apparatus comprising:
    the reforming catalyst degradation determining apparatus according to claim 1, and
    an air-fuel ratio controller that sets the air-fuel ratio of the mixture supplied to the reforming catalyst based on the temperature of the reforming catalyst detected by the temperature sensor.

9. The reforming catalyst degradation determining apparatus according to claim 1, wherein the electronic control unit determines that the reforming catalyst is degraded if the rate at which the temperature of the reforming catalyst detected by the temperature sensor rises, after the air-fuel mixture is supplied to the reforming catalyst, has not reached a predetermined rate.

10. A fuel reforming apparatus which determines whether a reforming catalyst that reforms a mixture of air and fuel is degraded, comprising:
    a temperature sensor that detects a temperature of the reforming catalyst;
    an electronic control unit that determines an extent of degradation of the reforming catalyst based on a rate at which the detected temperature of the reforming catalyst rises or falls after an air-fuel ratio of the mixture supplied to the reforming catalyst has been changed; and
    an air-fuel ratio controller that sets an air-fuel ratio of the mixture supplied to the reforming catalyst based on the temperature of the reforming catalyst detected by the temperature sensor, wherein catalyst degradation is determined based on correlation between the rate of catalyst temperature increase or decrease and the change in the air-fuel ratio of the mixture.

11. A reforming catalyst degradation determining method for determining whether a reforming catalyst that reforms a mixture of air and fuel is degraded, comprising:
    detecting a temperature of the reforming catalyst;
    determining that the reforming catalyst is degraded if a rate of increase in the detected temperature of the reforming catalyst after the mixture has started to be supplied to the reforming catalyst is slower than a predetermined rate; and determining an extent of degradation of the reforming catalyst based on a rate at which the detected temperature of the reforming catalyst rises or falls after an air-fuel ratio of the mixture supplied to the reforming catalyst has been changed, wherein catalyst degradation is determined based on correlation between the rate of catalyst temperature increase or decrease and the change in the air-fuel ratio of the mixture.

12. The reforming catalyst degradation determining method according to claim 11, wherein the reforming catalyst is determined to be degraded if the rate at which the detected temperature of the reforming catalyst rises, after the temperature of the reforming catalyst starts to rise, has not reached a predetermined rate.

13. The reforming catalyst degradation determining method according to claim 11, wherein the reforming catalyst is determined to be degraded if the temperature of the reforming catalyst has not reached a predetermined temperature at a predetermined time after the temperature of the reforming catalyst starts to rise.

14. The reforming catalyst degradation determining method according to claim 11, wherein the predetermined rate is determined based on the time it takes for the temperature of the reforming catalyst to rise to a predetermined temperature after the temperature of the reforming catalyst starts to rise.

15. The reforming catalyst degradation determining method according to claim 11, wherein the reforming catalyst is determined to be degraded if the rate at which the temperature of the reforming catalyst falls, after the temperature of the reforming catalyst starts to fall, is faster than a predetermined rate.

16. The reforming catalyst degradation determining method according to claim 15, wherein the predetermined rate is set based on the time it takes for the temperature of the reforming catalyst to fall to a predetermined temperature.

17. A reforming catalyst degradation determining method for determining whether a reforming catalyst that reforms a mixture of air and fuel is degraded, comprising:

detecting a temperature of the reforming catalyst; and determining an extent of degradation of the reforming catalyst based on a rate at which the detected temperature of the reforming catalyst rises or falls after an air-fuel ratio of the mixture supplied to the reforming catalyst has been changed, wherein catalyst degradation is determined based on correlation between the rate of catalyst temperature increase or decrease and the change in the air-fuel ratio of the mixture.

* * * * *